United States Patent
Suzuki et al.

[19]

[11] Patent Number: 6,134,213
[45] Date of Patent: *Oct. 17, 2000

[54] DISC DEVICE HAVING DISC SELECTING FUNCTION

[75] Inventors: Shoji Suzuki; Tatsuhiko Tsuchiya, both of Tokyo, Japan

[73] Assignee: Alpine Electronics, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/149,510

[22] Filed: Sep. 8, 1998

[30] Foreign Application Priority Data

Sep. 8, 1997 [JP] Japan .................................... 9-242619

[51] Int. Cl.⁷ ............................ G11B 17/04; G11B 17/08
[52] U.S. Cl. ............................................ 369/192; 369/178
[58] Field of Search .................................... 369/192, 176, 369/34, 33, 30, 178, 179, 191, 35, 36, 37, 38, 39; 360/92

[56] References Cited

U.S. PATENT DOCUMENTS

| | | | |
|---|---|---|---|
| 5,119,354 | 6/1992 | Umesaki | 369/36 |
| 5,130,959 | 7/1992 | Wakatsuki | 369/77.2 |
| 5,555,239 | 9/1996 | Takai et al. | 369/192 |
| 5,561,657 | 10/1996 | Ogawa | 369/34 |
| 5,586,094 | 12/1996 | Pines et al. | 369/36 |
| 5,852,597 | 12/1998 | Fujisawa | 369/34 |
| 5,859,832 | 1/1999 | Osada | 369/178 |
| 5,953,293 | 9/1999 | Kajiyama et al. | 369/37 |
| 6,041,032 | 3/2000 | Ishida et al. | 369/191 |
| 6,058,097 | 5/2000 | Inoue | 369/192 |

*Primary Examiner*—David L. Ometz
*Assistant Examiner*—Franklin D. Altman, III
*Attorney, Agent, or Firm*—Brinks Hofer Gilson & Lione

[57] ABSTRACT

A disc device of the present invention comprises a disc accommodating unit (I) for accommodating a plurality of discs (D), a transfer mechanism (III) for removing a disc (D) from the disc accommodating unit (I), and a disc driving unit (II) capable of moving between a standby position P1 where it is not overlapped with the discs (D) accommodated in the disc accommodating unit (I) and a driving position P2 where it is overlapped with the discs (D) accommodated in the disc accommodating unit (I), and driving any one of the discs (D) accommodated therein. When the disc driving unit (II) is located at the standby position P1, the transfer mechanism (III) stands by at a position where it is overlapped with the disc driving unit (II), and when the disc driving unit (II) is located at the driving position P2, the transfer mechanism (III) moves to a position where it is not overlapped with the disc driving unit (II) and can transfer any one of the discs (D) accommodated in the disc accommodating unit (I). When a disc (D) is not being transferred from the disc accommodating unit (I), the transfer mechanism (III) stands by at the position where it is overlapped with the disc driving unit (II). In addition, the disc driving unit (II) is disposed so that it can move to the driving position P2 where it is overlapped with the discs (D) accommodated in the disc accommodating unit (I). Accordingly, the space efficiency of the device in a plan direction can be improved, and the size of the device can be reduced as a whole.

17 Claims, 20 Drawing Sheets

DISC DEVICE HAVING DISC SELECTING FUNCTION

BACKGROUND OF THE INVENTION

1. Field of the Invention

The present invention relates to a disc device including a disc accommodating unit in which a plurality of discs such as, for example, compact discs (CDs), digital versatile discs (DVD) and the like are accommodated, and having a disc selecting function for selecting any one of the discs accommodated in the disc accommodating unit and driving the selected disc.

2. Description of the Related Art

Conventional disc devices (disc changers) having a disc selecting function are arranged such that a magazine in which a plurality of discs are accommodated is loaded in a cabinet and any one of the discs in the magazine is selected and driven. A disc selecting operation executed by disc devices of this type is such that a disc driving unit, which has a turntable and an optical head, and a disc transfer mechanism are moved along the direction in which discs are disposed and stop at a position confronting a selected disc. Then, the selected disc is removed from the magazine by the disc transfer mechanism and clamped on the turntable in the disc driving unit.

In the above conventional disc devices, however, since the selected disc is removed from the magazine and driven by the disc driving unit, the disc accommodating unit having the magazine loaded therein requires a flat space which is a little larger than, for example, a disc having a diameter of 12 cm and, further, a region where the disc removed from the disc accommodating unit is driven in addition to the above described space. Thus, there is a limit to the reduction of the flat shape of conventional disc devices.

To cope with this problem, there also have been contemplated disc devices which are arranged such that a selected disc is not completely removed from a disc accommodating unit and an information reproducing operation and the like are carried out by driving the disc in a state such that the disc partially remains in the disc accommodating unit.

However, the above conventional disc devices having the disc selecting function have the following problems.

(1) When the selected disc is loaded on the disc driving unit in the situation where it partially remains in the disc accommodating unit, the selected disc, a disc transfer mechanism and a disc driving unit must be disposed side by side in the same plane on a disc transfer plane, respectively. Further, the disc transfer mechanism and the disc driving unit are conventionally disposed side by side on the same plane even while a disc selecting operation is being executed and a disc is not yet removed from the disc accommodating unit. Therefore, it is also necessary to secure an area in the disc device where the disc accommodating unit, the disc transfer mechanism and the disc driving unit are disposed on the same plane, and thus it is difficult to reduce the size of the disc device. Accordingly, it has been physically difficult for a cabinet of, for example, an 1 DIN size to accommodate a disc accommodating unit capable of accommodating a 12 cm dia. disc, a disc transfer mechanism and a disc driving unit and to execute a disc selecting operation, a reproducing operation, and the like in the cabinet.

(2) In the above disc device which is provided with the disc selecting function using the magazine, it is difficult to supply discs one by one from the outside of a cabinet. To permit the discs to be supplied one by one, the disc accommodating unit, the disc transfer mechanism and the disc driving unit also must be disposed side by side on the disc transfer plane; they also must be disposed at positions where they are located in line with a disc inserting port formed in the cabinet. Therefore, there is a limit to the reduction of the size of the cabinet.

An object of the present invention is to solve the above described conventional problems by providing a disc device capable of improving the space efficiency in the device in which various units and mechanisms are disposed, and permitting the overall size of the device to be reduced.

SUMMARY OF THE INVENTION

The present invention solves the above-described problems and is characterized by a disc device which comprises a disc accommodating unit (I) for accommodating a plurality of discs (D); a transfer mechanism (III) for removing a disc (D) from the disc accommodating unit (I); and a disc driving unit (II) capable of moving between a standby position (P1) where it is not overlapped with the discs (D) accommodated in the disc accommodating unit (I) and a driving position (P2) where it is overlapped with the discs (D) accommodated in the disc accommodating unit (I) as well as driving any one of the discs (D) accommodated therein, wherein when the disc driving unit (II) is located at the standby position (P1), the transfer mechanism (III) stands by at a position where it is overlapped with the disc driving unit (II), and when the disc driving unit (II) is located at the driving position (P2), the transfer mechanism (III) moves to a position where it is not overlapped with the disc driving unit (II) and can transfer any one of the discs (D) accommodated in the disc accommodating unit (I).

The present invention is also applicable to disc devices which do not have a disc inserting port formed in the cabinet and, for example, a magazine in which a plurality of discs are loaded may be disposed in the disc accommodating unit.

The transfer mechanism, which is used to load on the disc driving unit a disc selected from the plurality of discs accommodated in the disc accommodating unit, stands by at a position where it is overlapped with the disc driving unit when no disc is taken out from the disc accommodating unit. Therefore, the space efficiency of the device in a plan view can be improved and the overall size of the device can be reduced. The transfer mechanism may be provided with a function for returning a disc loaded on the disc driving unit to the disc accommodating unit.

Since the disc driving unit is disposed so that it can move between the standby position where it is not overlapped with the discs accommodated in the disc accommodating unit and the driving position where it is overlapped with the discs accommodated in the disc accommodating unit, as well as drive any one of the discs accommodated therein, the amount of withdrawal of a selected disc which is taken from the disc accommodating unit can be reduced, whereby the miniaturization of the device is facilitated.

In the above described invention, it is preferable that when the disc driving unit moves from the standby position to the driving position, the transfer mechanism moves to the region which was occupied by the disc driving unit at the standby position and transfers any one of the discs in the disc accommodating unit.

With this arrangement, the same region in the device can be used as the position where the disc driving unit stands by and the position where the transfer mechanism transfers a disc, whereby the space efficiency the device can be improved and the overall size of the device can be reduced.

The transfer mechanism (III) may include a transfer roller (21) for applying a transfer force to a disc (D) and a confronting member (26) for clamping the disc (D) between the transfer roller (21) and the confronting member (26). At least one of the transfer roller (21) and the confronting member (26) is supported by rotatably disposed arms (23a, 23b). When the transfer mechanism (III) is located at the position where it is overlapped with the disc driving unit (II), both of the transfer roller (21) and the confronting member (26) are located on one side of a disc transfer plane (L), whereas when a disc (D) is to be transferred by the transfer mechanism (III), the arms (23a, 23b) are rotated so as to move the roller (21) and the confronting member (26) to positions where they confront each other across the disc transfer plane (L).

In this case, a confronting pad formed of a resin material having a small coefficient of friction, for example, may be applied to the confronting member. Otherwise, the confronting member may be arranged as a follower roller (confronting roller) for clamping a disc in cooperation with the transfer roller. Further, both of the transfer roller and the confronting member may be supported by a rotating arm, and both the transfer roller and the confronting member may be moved by the rotation of the rotating arm to a position where they can clamp the disc.

When at least one of the transfer roller and the confronting roller is arranged to be moved by the rotation of the rotating arm to the position where it can clamp the disc as described above, a mechanism for moving the transfer roller and the like to the standby position where they are overlapped with the disc driving unit and to the transfer position where they can clamp the disc can be simplified.

It is preferable that the other of the transfer roller (21) and the confronting member (26) which is not supported by the arms (23a, 23b) is supported by rotatably disposed parallel links (28a, 28b) and moved by the rotation of the parallel links (28a, 28b) to a position where it can clamp a disc between the transfer roller (21) and the confronting member (26).

According to the above arrangement, since either one of the transfer roller and the confronting member is moved by the parallel links, the moving region where they move from the standby position at which they are overlapped with the disc driving unit to the position at which a disc is transferred can be reduced, whereby the size of the device can be made thinner.

A disc device having a disc selecting function of the present invention comprises a cabinet (1); a disc inserting port (2) formed in the cabinet (1); a disc accommodating unit (I) disposed in the cabinet (1) and having a plurality of discs (D) accommodated therein; a transfer mechanism (III) for transferring discs (D) inserted through the disc inserting port (2) to respective disc supporting members (6) provided in the disc accommodating unit (I); and a disc driving unit (II) capable of moving between a standby position (P1) where it is not overlapped with the discs (D) accommodated in the disc accommodating unit (I) and a driving position (P2) where it is overlapped with the discs (D) accommodated in the disc accommodating unit (I) as well as driving any one of the discs (D) accommodated therein, wherein when the disc driving unit (II) is located at the standby position (PI), the transfer mechanism (III) stands by at a position where it is overlapped with the disc driving unit (II), and when the disc driving unit (II) is located at the driving position (P2), the transfer mechanism (III) moves to a position where it is not overlapped with the disc driving unit (II) and can transfer a disc (D) between the disc inserting port (2) and any one of the disc supporting members (6).

The above invention is arranged such that a disc can be supplied from the disc inserting port of the cabinet into the disc accommodating unit and loaded thereon. The disc inserting port of the present invention is not limited to the port having an opening area (the height of the disc inserting port) which permits only one disc to be inserted therethrough but includes a port having an opening area whose height is as high as the height of the discs in the direction where they are disposed in the disc accommodating unit. That is, the invention includes a disc inserting port which is arranged such that discs can be transferred to all the disc supporting members of a disc accommodating unit, respectively, through a disc inserting port having a large opening. Further, the invention includes a disc inserting port which is arranged such that a disc accommodating unit is fixedly disposed and a transfer mechanism and a disc driving unit move in a direction where discs are disposed between the disc inserting port and the disc accommodating unit.

In the above invention, when a disc selecting operation and the like are carried out, the transfer mechanism and the disc driving unit are overlapped with each other, and further when a disc is driven, the disc driving unit moves to the position where it is overlapped with the discs in the disc accommodating unit. Accordingly, it is not necessary to provide a space in which the transfer mechanism and the disc driving unit are disposed side by side on the same plane, whereby the size of the cabinet can be reduced and the respective mechanisms can be disposed in a cabinet of, for example, an 1 DIN size.

In the above invention, it is preferable to provide a selective drive mechanism (IV) for moving the disc accommodating unit (I) in a direction where the discs (D) are disposed, wherein when the disc driving unit (II) is located at the standby position (P1) and the transfer mechanism (III) is located at the position where it is overlapped with the disc driving unit (II), the disc accommodating unit (I) is moved by the selective drive mechanism (IV) and a selected disc in the disc accommodating unit (I) is moved to a position where it can be loaded on the disc driving unit (II).

It is preferable that when the disc driving unit (II) moves to the driving position (P2), the transfer mechanism (III) moves to a position where it can transfer the selected disc (D) in the disc accommodating unit (I) to the disc driving unit (II), and at the time the selected disc (D), the disc driving unit (II), and the transfer mechanism (III) are located at positions where they are placed in line with the disc inserting port (2).

With this arrangement, the transfer of the disc inserted into the disc accommodating unit through the disc inserting port and the removal of the disc from the disc accommodating unit to the disc driving unit can be executed by means of a single transfer mechanism.

In the above respective aspects of the invention, since the disc accommodating unit is moved in the direction in which the discs are disposed, the opening area of the disc inserting port can be made to be such a size as to permit only one disc to be inserted therethrough. Thus, other operating keys and a display unit, for example, can be disposed on an operating panel around the periphery of the disc inserting port. Further, a disc inserted through the disc inserting port can be loaded on an optional disc supporting member of the disc accommodating unit and any optional disc in the disc accommodating unit can be discharged through the disc inserting port.

DESCRIPTION OF THE PREFERRED EMBODIMENT (Overall Structure)

Figure 1:
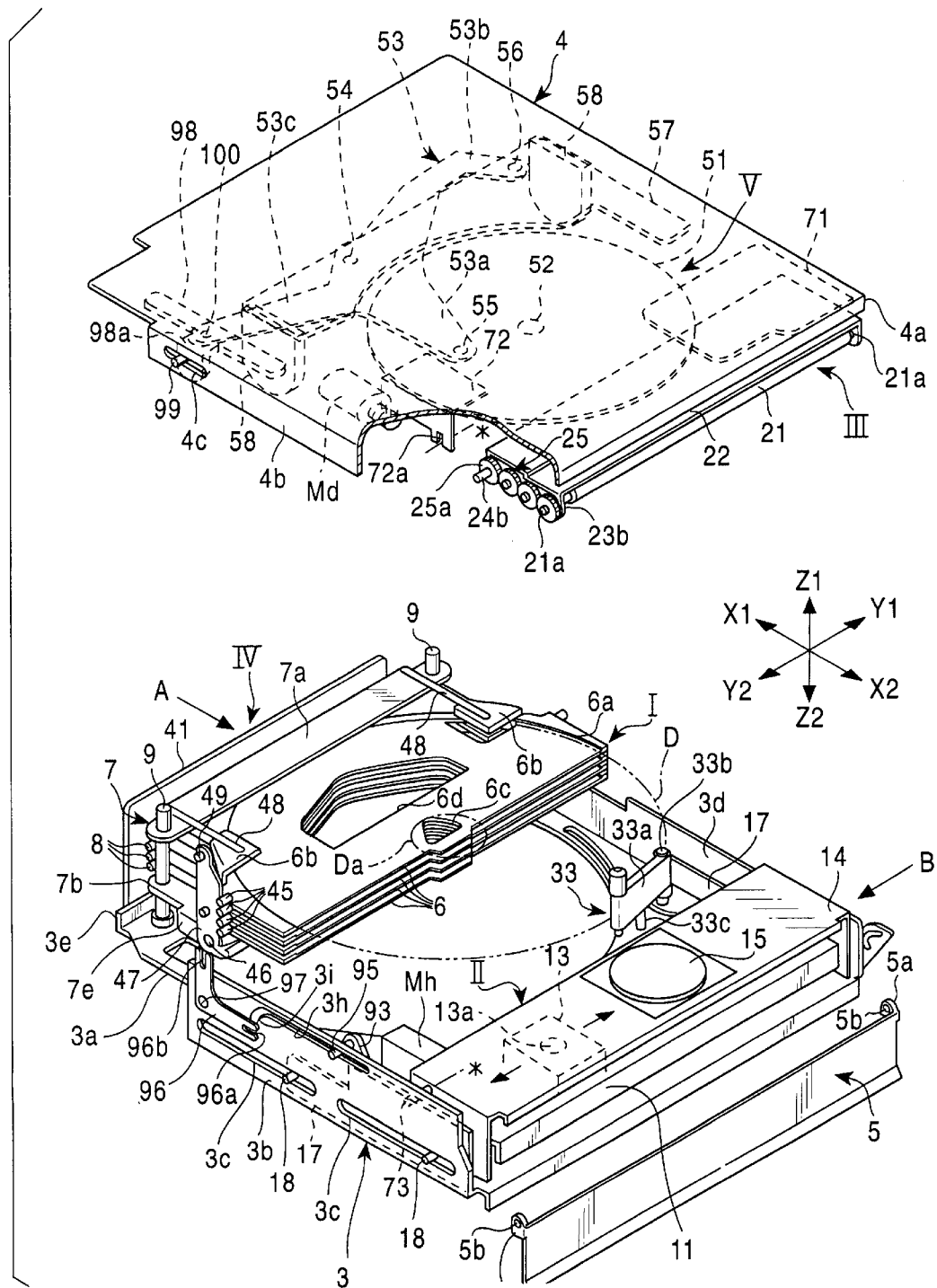
FIG. 1 is a perspective view showing the main portion of a disc device of the present invention having a disc selecting function.

FIG. 1 is a perspective view showing the main portion of a disc device of the present invention having a disc selecting function, and FIG. 2, FIG. 3, FIG. 4 and FIG. 5 are side elevational views showing the disc device in its respective operating states.

Figure 2:
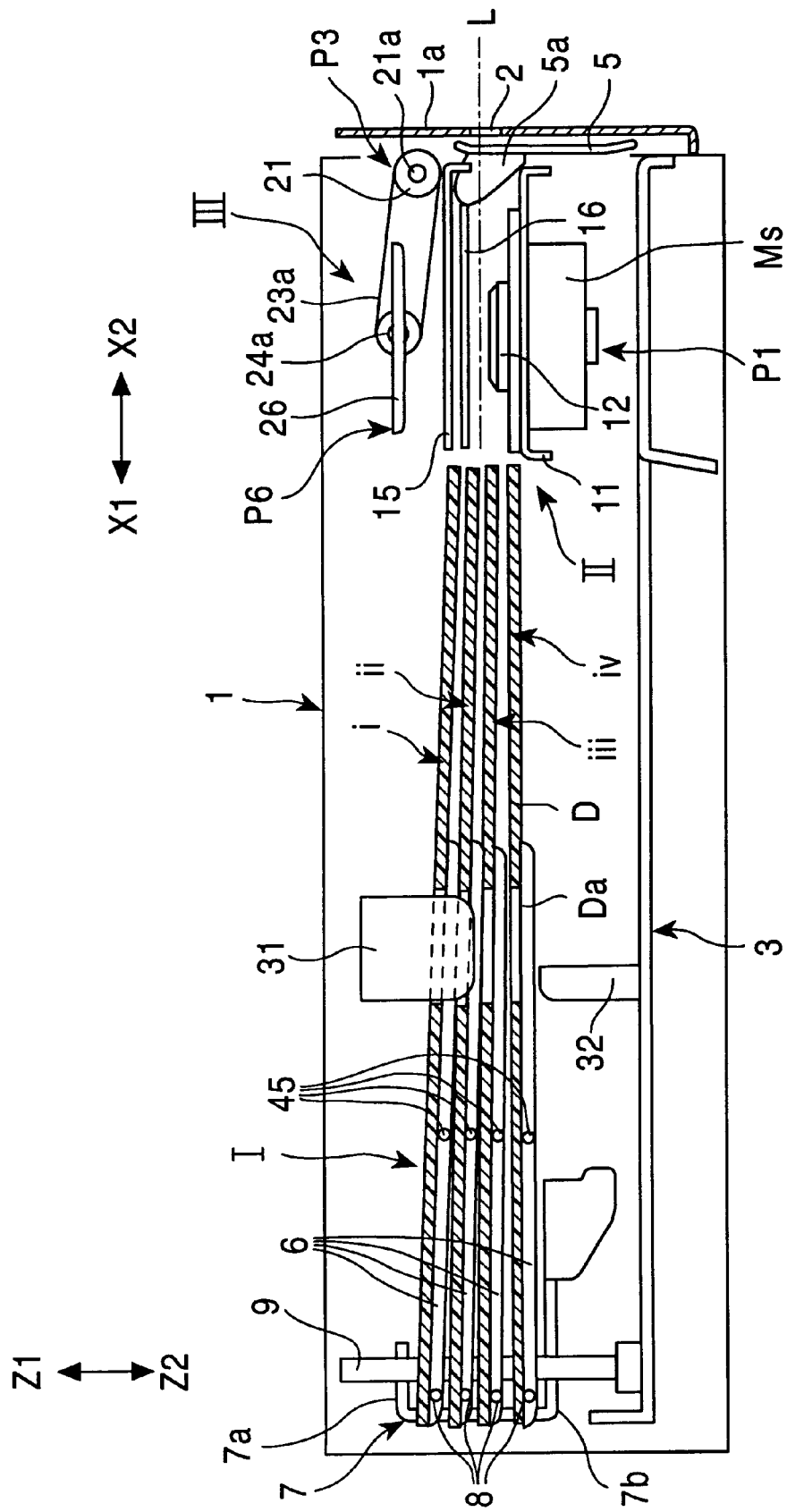
FIG. 2 is a side elevational view showing an operation for selecting a disc by the movement of a disc accommodating unit.

As shown in FIG. 2, the disc device has a cabinet 1 formed to a size which is slightly smaller than a so-called 1 DIN size. The disc device is ordinarily embedded in the console panel of a vehicle such an automobile or the like and installed such that a front surface 1a is approximately flush with the console panel. A disc inserting port 2 is opened at a position slightly higher than the center of the front surface 1a so that discs D are inserted and discharged therethrough one by one. The disc D to be loaded on the disc device is a compact disc (CD) a digital versatile disc (DVD) or the like.

A mechanical unit is accommodated within the cabinet 1. The mechanical unit is formed by the combination of a lower chassis 3 and an upper chassis 4. The lower chassis 3 and the upper chassis 4 are formed of metal sheets which are bent through a stamping process. They are secured to each other by screws or the like in the assembled state.

As shown in FIG. 2, a shutter guide plate 5 is disposed inwardly of the front surface 1a of the cabinet 1. As shown in FIG. 1, the shutter guide plate 5 has bent portions 5a that are formed at the upper, opposite sides thereof, and they are supported so as to rotate with respect to the lower chassis 3. When the shutter guide plate 5 is disposed in a vertical direction, the disc inserting port 2 is closed from the inside thereof. At this time, a disc D cannot be erroneously inserted through the disc inserting port 2 and foreign matter cannot be inserted therethrough.

Figure 3:
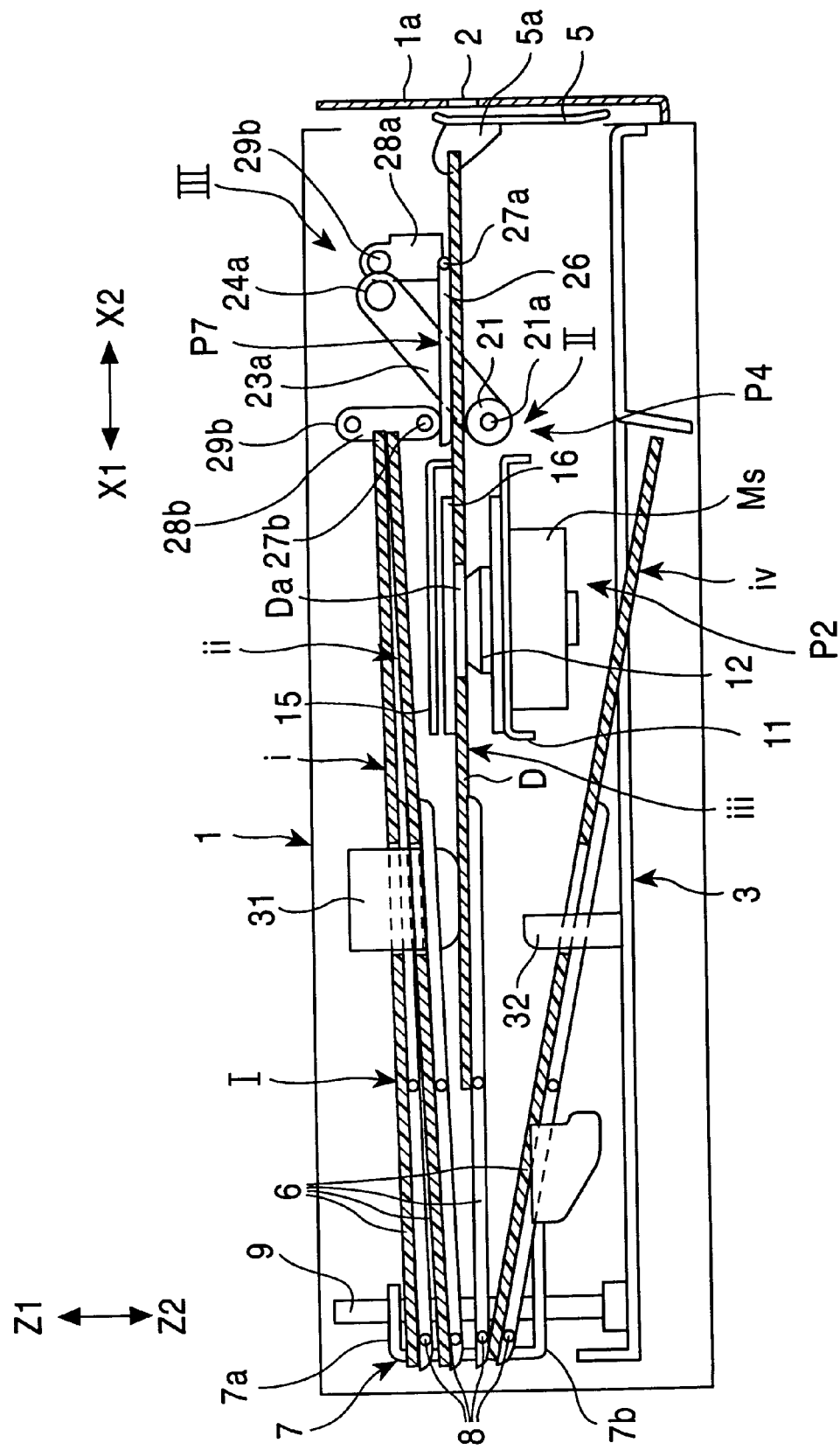
FIG. 3 is a side elevational view showing an operation for removing a selected disc from the disc accommodating unit.
Figure 4:
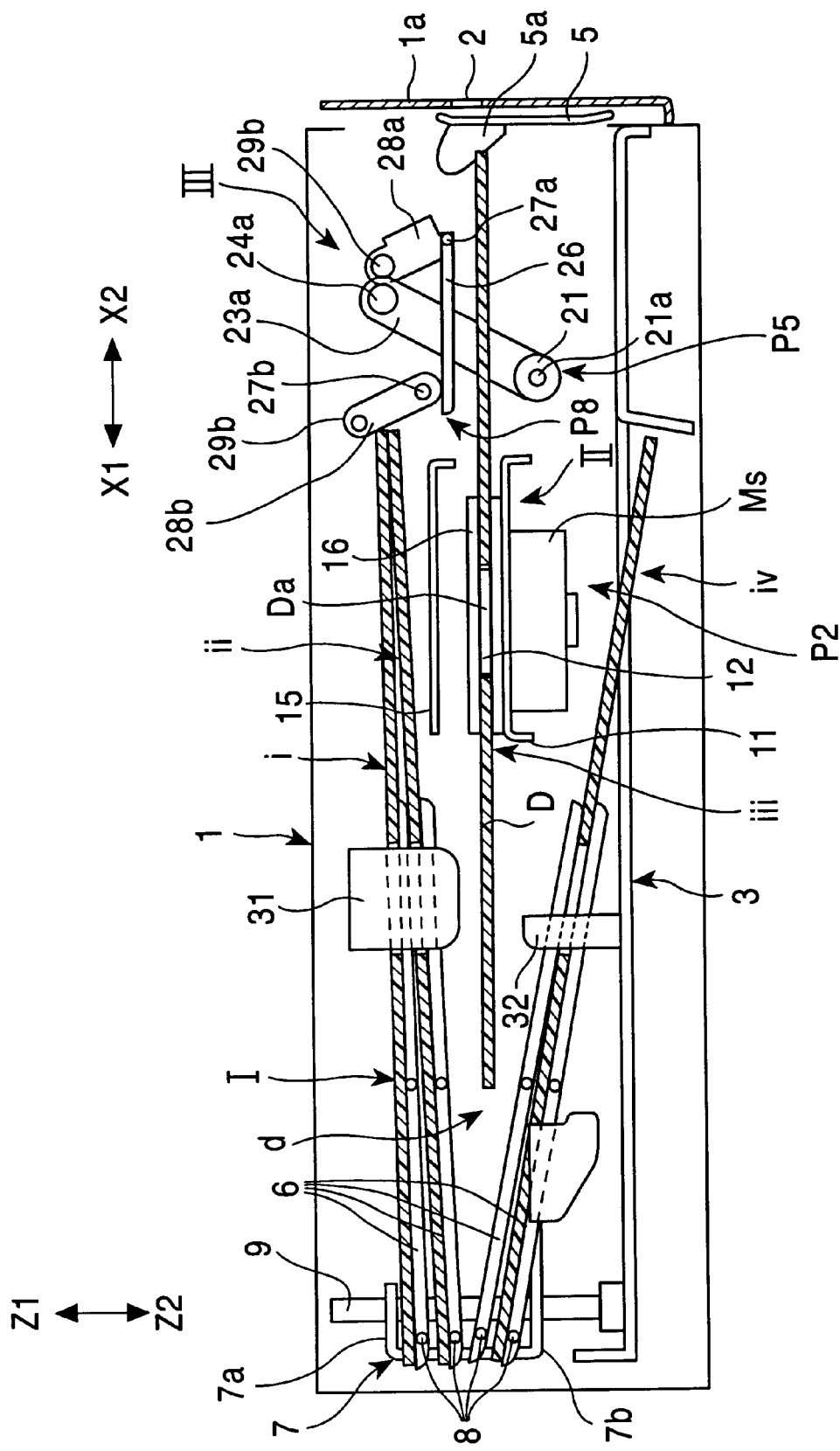
FIG. 4 is a side elevational view showing the state in which the selected disc is driven.
Figure 5:
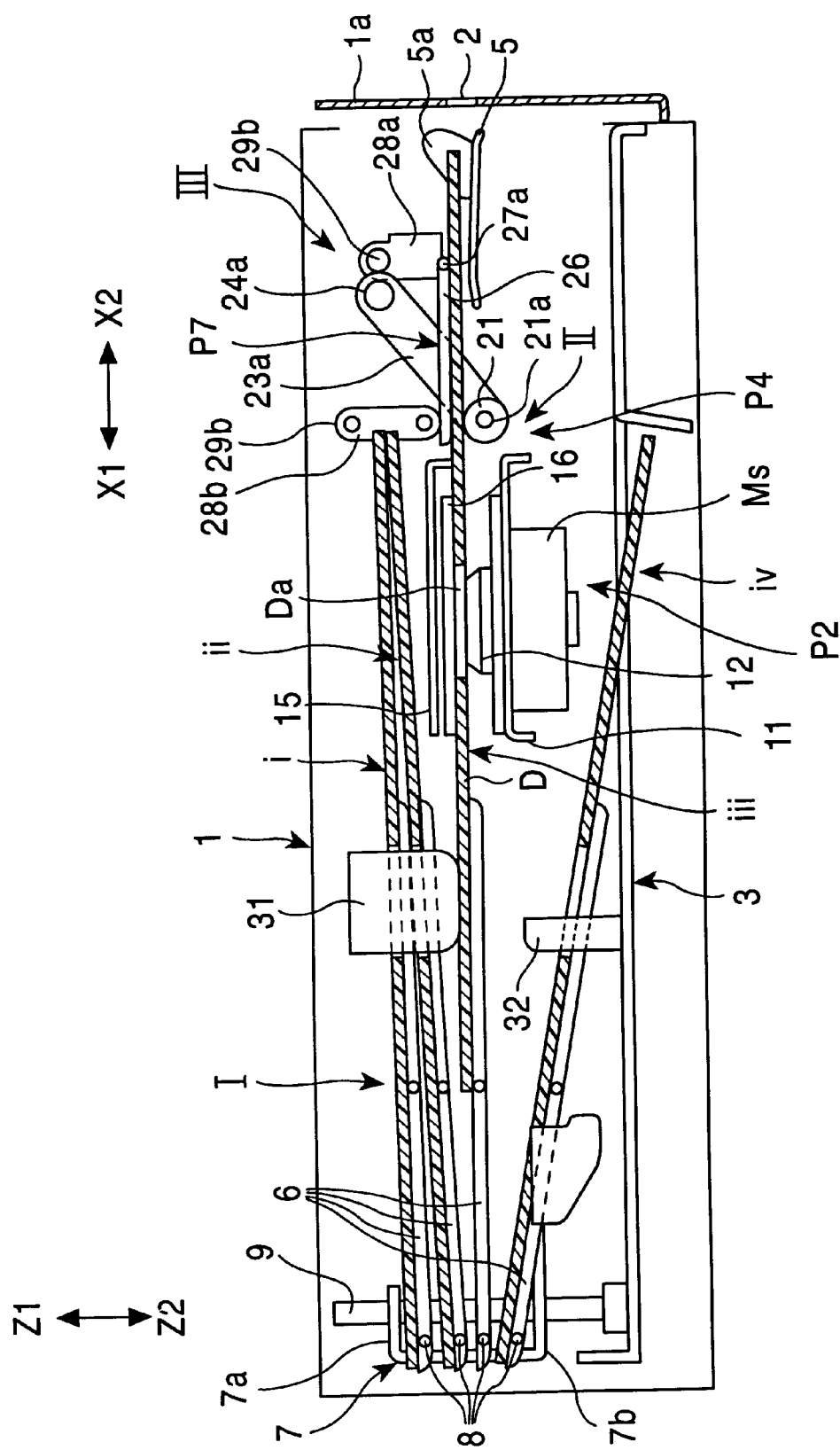
FIG. 5 is a side elevational view showing an operation for inserting and discharging a disc.

It is in a standby state as shown in FIG. 2 while a disc selecting operation is being executed, whereas a disc loading operation is shown being executed in FIG. 3, and a disc is shown being driven in FIG. 4, the disc inserting port 2 being closed by the shutter guide plate 5. When a disc inserting or discharging operation is executed as shown in FIG. 5, the shutter guide plate 5 is rotated about the support holes 5b as fulcrums which are formed in the bent portions 5a. At this time, the disc inserting port 2 is opened as the shutter guide plate 5 maintains a horizontal orientation inwardly and downwardly of the disc inserting port 2. As a result, the shutter guide plate 5 functions as a guide member for guiding a disc D inserted or discharged through the disc inserting port 2 at a lower position.

A disc accommodating unit I is disposed on the inner portion of the lower chassis 3 which is opposite to the portion where the disc inserting port 2 is formed.

A plurality (four sheets in the illustrated example) of disc supporting members (supporting plates or supporting trays) are provided with the disc accommodating unit I to support respective discs D. The base end of each of the disc supporting members 6 is held by a holding bracket 7 formed of a metal sheet.

Figure 6:
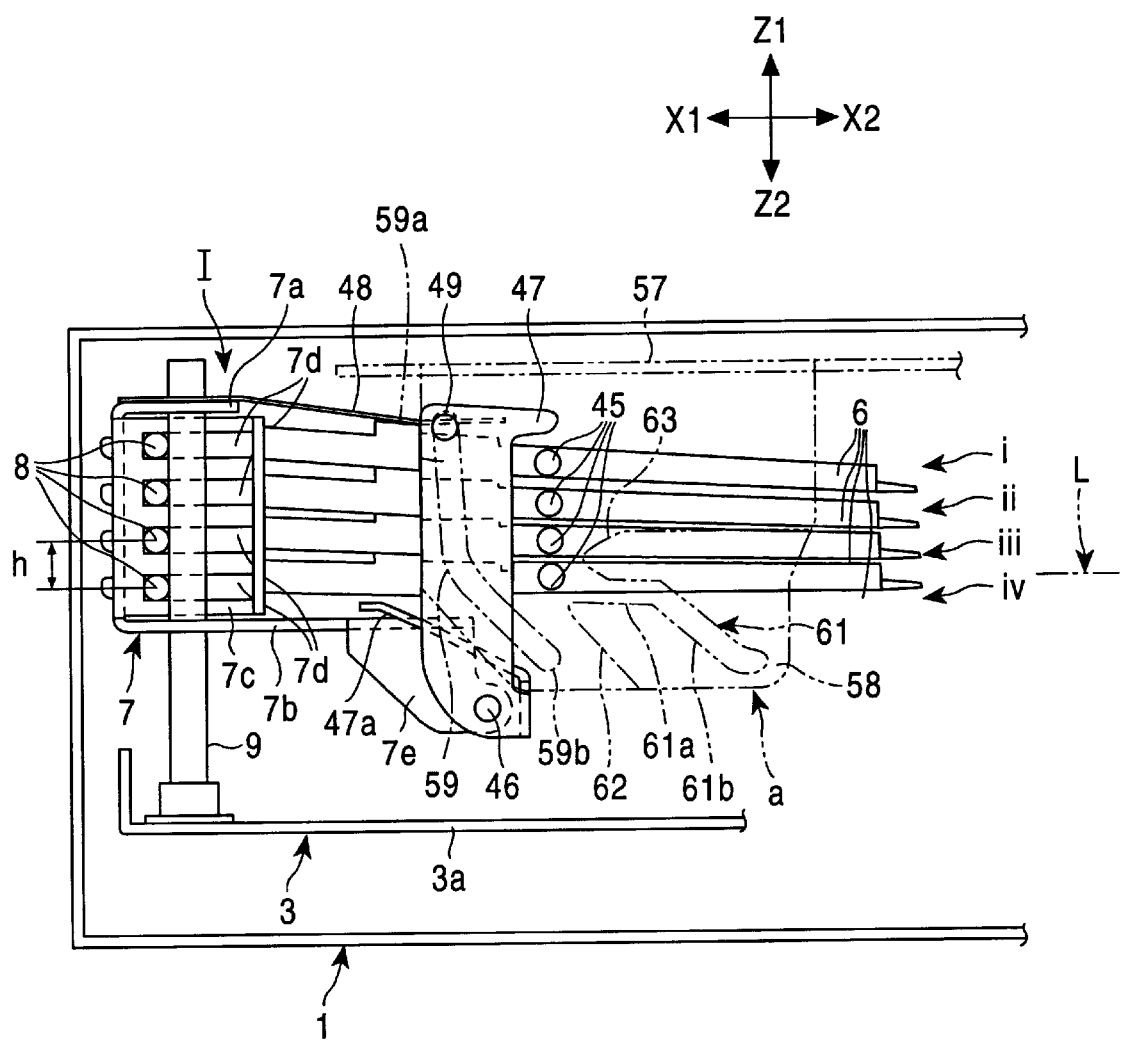
FIG. 6 is a partially enlarged side elevational view showing the state in which a lowermost stage disc supporting member is selected.

As shown in detail in the side elevational view of FIG. 6, the holding bracket 7 has an upper bent portion 7a and a lower bent piece 7b formed thereto, and the base ends of the four disc supporting members 6 are held between the upper bent portion 7a and the lower bent piece 7b. The upper bent portion 7a and the lower bent piece 7b are inserted around guide shafts 9 which are vertically fixed to the bottom plate 3a of the lower chassis 3 in the Z-axis direction so that the holding bracket 7 can move upward and downward along the guide shafts 9 in the Z-axis direction.

As shown in FIG. 6, the holding bracket 7 is bent at the opposite sides thereof to thereby form supporting pieces 7c, and four holding grooves 7d which extend in an X-direction are formed in the supporting pieces 7c. A support shaft 8 is fixed at the opposite sides of each disc supporting member 6 at the base end thereof and held between the X1 side terminal end of the holding groove 7d and the guide shaft 9 so that each disc supporting member 6 can be swung (rotated) upward and downward about the support shaft 8 at the base end thereof.

As shown in FIG. 1, a semi-circular recessed portion 6a is formed in the upper surface of each disc supporting member 6, and one disc D is placed on the recessed portion 6a of each disc supporting member 6. A pair of regulating pieces 6b are formed on the upper surface of the disc supporting member 6 integrally therewith on the base end side thereof. Since the disc D placed on the recessed portion 6a is subjected to downward regulation by the regulating pieces 6b, it is held so as not to be lifted from the recessed portion 6a.

A home-base shaped escaping hole 6d is formed in the disc supporting member 6 and a triangular regulating hole 6c is opened in the portion of the disc supporting member 6 where the center hole Da is disposed at the center of the disc D.

The lower chassis 3 is provided with a disc driving unit 11. As shown in FIG. 1 and FIG. 2, the disc driving unit 11 is provided with a drive chassis 11 extending in a width-wise direction (Y-direction). As shown in FIG. 2, the drive chassis 11 includes a turntable 12 and a spindle motor Ms for turning the turntable 12 mounted thereon. Further, as shown in FIG. 1, the drive chassis 11 is provided with an optical head 13 which is moved by a thread motor Mh mounted on the drive chassis 11 in the direction (Y-direction) orthogonal to the direction where a disc D is transferred.

The optical head 13 includes an objective lens 13a which confronts the recording surface of a disc D. In addition, the optical head 13 accommodates a light emitting element for emitting reading light, a light receiving element for receiving light returned from the disc and other optical components.

A support frame 14 is disposed above the drive chassis 11, a clamp support member 15 is upward/downward movably supported in the support frame 14 and a clamper 16 is rotatably supported by the clamp support member 15 (see FIG. 2).

The disc driving unit II is mounted on a moving base 17. As shown in FIG. 1, a pair of right and left sliding shafts 18 are fixed at each of the opposite sides of the moving base 17. Guide slots 3c extending in the X-direction are formed in a slide plate 3b of the lower chassis 3. The sliding shafts 18 are guided by the guide slots 3c so that the moving base 17 and the disc driving unit 11 can be moved in the X1–X2 direction. Likewise, guide slots 3c are also formed in the other side plate 3d of the lower chassis 3 so that the opposite sides of the moving base 17 in the Y-direction are moved by being guided by the guide slots 3c formed in the side plates 3b and 3d, respectively.

The moving base 17 and the disc driving unit II move to two positions, that is, to a standby position P1 which is nearest to the disc inserting port 2 (the X2 side) as shown in FIG. 2 and to a driving position P2 which is moved nearer to the inner portion of the device than the standby position P1 (X1 side) as shown in FIG. 3 to FIG. 5; and the disc driving unit II reciprocates therebetween.

The upper chassis 4 is provided with a transfer mechanism III which is located in a region just inwardly of the disc inserting port 2 (the X1 side).

The transfer mechanism III is provided with a transfer roller 21. The transfer roller 21 is composed of a roller shaft 21a and a material such as rubber or the like having a large coefficient of friction and fixed around the outer periphery of the roller shaft 21a. As shown in FIG. 1, the roller shaft 21a of the transfer roller 21 is held by a roller holder 22 and can resiliently press the disc D by a spring force. As shown in FIG. 2, the roller shaft 21a, which protrudes from opposite sides of the roller holder 22, is supported by an arm 23a disposed at the end thereof on a Y1-side and also supported by an arm 23b at the end thereof on a Y2-side. The base ends of the respective arms 23a, 23b are supported so as to be rotated through support shafts 24a, 24b with respect to the bent side plates 4a, 4b located on the opposite sides of the upper chassis 4.

As shown in FIG. 1, the arm 23b is provided with a gear train 25 which transfers a rotational force from the support shaft 24b to the roller shaft 21a. Further, a transfer motor (not shown) is mounted on the lower surface of the upper chassis 4 to apply a rotational force to a gear 25a fixed to the support shaft 24b, and the transfer roller 21 is rotated forward and rearward by the rotational force of the transfer motor.

The arms 23a, 23b are rotated clockwise in FIG. 2 from the position shown in the Figure as a starting point and reaches the position shown in FIG. 3. As a result, the transfer roller 21 moves between three positions, that is, between a standby position P3 located above the disc driving unit II which stands by at the above position as shown in FIG. 2, a transfer position P4 which is reached when the transfer roller 21 is rotated to a farthest clockwise position as shown in FIG. 3 and FIG. 5, and a retreating position P5 which is reached when it is rotated slightly counterclockwise from the transfer position P4 as shown in FIG. 4.

The transfer mechanism III is provided with a confronting pad (confronting member) 26 for clamping a disc between it and the transfer roller 21. The confronting pad 26 is formed of a resin material having a small coefficient of friction. As shown in FIG. 4, the confronting pad 26 is coupled with a pair of links (parallel links) 28a, 28b by shafts 27a, 27b, and the links 28a, 28b are rotatably supported on a support member (not shown) disposed with respect to the upper chassis 4 through shafts 29a, 29b. Therefore, the confronting pad 26 moves in an approximately parallel orientation. The movement of the confronting pad 26 is associated with the rotating motion of the arms 23a, 23b which support the transfer roller 21. The confronting pad 26 moves between three positions, that is, between a standby position P6 shown in FIG. 2, a transfer position P7 shown in FIG. 3 and FIG. 5 and a retreating position P8 shown in FIG. 4.

(Overall Operation)

The overall operation of the disc device will be described with reference to the respective side elevational views shown in FIG. 2 to FIG. 5.

The disc device is arranged such that discs D are inserted into and discharged from the device one by one through the disc inserting port 2. Therefore, the discs D are always transferred to a position which is as high as the position where the disc inserting port 2 is formed. The plane on which the discs D are transferred is denoted by L in FIG. 2.

FIG. 2 shows an operation for selecting a disc D in a state in which discs D are held by the respective disc supporting members 6 of the disc accommodating unit I.

In the disc device, the holding bracket 7, which holds the base ends of the respective disc supporting members 6, is moved upward and downward in a Z1–Z2 direction while guided by guide shafts, 9 in the disc accommodating unit 1, whereby the disc is selected. More specifically, when the disc D to be selected is caused to reach the height of the transfer plane L by the upward/downward movement of the holding bracket 7 in the Z1–Z2 direction, the upward/downward movement thereof is stopped.

As shown in FIG. 2, an upper regulating member 31 and a lower regulating member 32 are disposed to prevent the disc D held by the disc supporting member 6 from slipping out in the X2-direction. That is, when the holding bracket 7 moves upward and downward, the regulating members 31, 32 are inserted into the regulating hole 6c (see FIG. 1) formed in the disc supporting member 6 and the center hole Da of the disc D so that the slipping-out of the disc D in the X2-direction is regulated. Since a vertical interval is formed between the regulating members 31, 32, the disc D having reached the height of the transfer plane L is located in the interval between the regulating members 31, 32 and released from the regulation executed by them. To cope with this problem, a different regulating member 33 is disposed in confrontation with the outside edges of the discs D to prevent all the discs D, or at least the disc that is located at a position where it is not regulated by the regulating members 31, 32, from slipping out in the X2-direction in the disc selecting operation, as shown in FIG. 1.

In the disc selecting operation shown in FIG. 2, the moving base 17 and the disc driving unit II mounted thereon move to the inside of the disc inserting port 2 which is opposite to the disc accommodating unit I and are located at the standby position P1. Further, the transfer roller 21 and the confronting pad 26 which constitute the transfer mechanism III are located at the standby positions P3, P6 where they are overlapped with the disc driving unit II at positions above it.

In the disc device, the disc driving unit II and the transfer mechanism III are located at the standby positions where they are overlapped with each other in the Z-direction and do not interfere with the disc D in this state, such that the discs D such as a CD and a DVD having a diameter of 12 cm are accommodated in the disc accommodating unit 1. As a result, even if the disc accommodating unit 1, the disc driving unit II and the transfer mechanism III are accommodated in the cabinet 1 of, for example, a 1 DIN size, the movement of the respective discs D is not prevented by the disc driving unit II and the transfer mechanism III when the selecting operation is executed by moving the respective discs D upward and downward.

During the disc selecting operation shown in FIG. 2, the shutter guide plate 5 is in a vertical orientation so that the disc inserting port 2 is closed from the inside thereof. Accordingly, a new disc D cannot be erroneously inserted through the disc inserting port 2.

An operation for selecting a disc D located at the third highest stage (hereinafter, referred to as a third stage) (iii) from the discs D accommodated in the disc accommodating unit I will be described as an example.

As described above, the holding bracket 7 is moved upward and downward and stopped when the third stage (iii) disc D reaches the transfer plane L.

At this time, the two disc supporting members 6 at the uppermost stage (i) and the second highest stage (hereinafter, referred to as a second stage) (ii) are lifted using the support shafts 8 as fulcrums. The disc supporting member 6 at the lowermost stage (iv) is also rotated downward using the support shaft 8 as the fulcrum to thereby form intervals (spaces) above and under the third stage (iii) disc supporting member 6 by which the disc D to be selected is held. At this time, the third stage (iii) disc supporting member 6 is caused to be in an approximately horizontal orientation at a position where the height thereof substantially coincides with the height of the transfer plane L.

Next, the moving base 17 and the disc driving unit II supported thereby are moved in the X1-direction to the driving position P2. At this time, the turntable 12 passes below the third stage disc D which is in an approximately horizontal orientation, and the camper 16 passes above the disc D.

After the moving base 17 moves to the driving position P2 or simultaneously with the movement thereof, the arms 23a, 23b of the transfer mechanism III are rotated clockwise about the support shafts 24a, 24b as fulcrums so that the transfer roller 21 is moved to the transfer position P4. At the same time, the confronting pad 26 also moves to the transfer position P7 parallel to itself. Since the X2-side end of the third stage (iii) disc D slightly protrudes from the disc driving unit II in the X2-direction at this time, the X2-side end thereof is clamped between the transfer roller 21 and the confronting pad 26.

When the transfer roller 21 is rotated by the driving force of the transfer motor disposed on the upper chassis 4 through the gear train 25 shown in FIG. 1, the disc D clamped between the transfer roller 21 and the confronting pad 26 is taken out in the X2-direction by the rotational force of the transfer roller 21. Then, when the center hole Da of the disc D approximately coincides with the center of rotation of the turntable 12, the transfer roller 21 is stopped.

Next, as shown in FIG. 4, the disc supporting member 6 supporting the third stage (iii) disc D in an approximately horizontal orientation is greatly rotated downward and separated from the lower surface of the third stage (iii) disc D. Substantially simultaneously with the above operation, the arms 23a, 23b of the transfer mechanism III are rotated counterclockwise so that the transfer roller 21 is moved to the retreating position P5 which is spaced apart and downward from the disc D. The confronting pad 26 is lifted to the retreating position P8 spaced apart from the disc D in synchronism with the movement of the transfer roller 21. Then, the damper 16 is lowered in the disc driving unit II and the third stage disc D released thereby is clamped between the turntable 12 and the damper 16 at the peripheral edge of the center hold Da thereof.

The disc D clamped between the turntable 12 and the damper 16 is turned by the power of the spindle motor Ms. In addition, the optical head 13 is moved in the Y-direction (direction orthogonal to the transfer direction of the disc D) by the power of the thread motor Mh in the disc driving unit II so that information is read out from or written to the recording surface of the disc D.

When the disc D is taken out as shown in FIG. 3 and when the disc D is inserted or discharged as shown in FIG. 5, the transfer roller 21 and the confronting pad 26 which constitute the transfer mechanism III are moved to the transfer positions P4, P7 respectively. The region where the transfer roller 21 and the confronting pad 26 are located at the transfer positions P4, P7 is located within the same region which was occupied by the disc driving unit II when it was located at the standby position P1. Since the same region is used as the standby position P1 of the disc driving unit II and the transfer positions P4, P7 of the transfer mechanism III, the space efficiency in the cabinet 1 can be improved and the overall size of the device can be reduced. Further, the retreating positions P5, P8 where the transfer roller 21 and the confronting pad 26 of the transfer mechanism III are located when the disc is driven as shown in FIG. 4 are also located within the same region which was occupied by the disc driving unit II when it was located at the standby position P1.

When the disc D is turned by being clamped between the turntable 12 and the damper 16 as shown in FIG. 4, the disc supporting member 6 which supported the disc D up to that time is lowered. At this time, the X1-side edge (d) of the disc D being driven confronts the portion of the escape hole 6d of the lowered disc supporting member 6. Therefore, the edge (d) of the disc D being driven does not come into contact with the disc supporting member 6.

On the completion of the drive of the disc D, the state shown in FIG. 3 is restored again. That is, the damper 16 is lifted to thereby release the clamp of the disc D. Further, the third stage (iii) disc supporting member 6 is rotated counterclockwise from the state shown in FIG. 4 and reaches the position of FIG. 3 to thereby support the disc D from the lower side thereof. Substantially at the same time, the transfer roller 21 and the confronting pad 26 reach the transfer position P4, P7. Then, the disc D is transferred in the X1-direction by the rotational force of the transfer roller 21 and held by the third stage disc supporting member 6.

When another disc D is to be selected thereafter, the disc driving unit II is returned to the standby position P1 as shown in FIG. 2 and the transfer roller 21 and the confronting pad 26 are also returned to the standby positions P3, P6. The holding bracket 7 and the respective disc supporting member 6 are moved upward and downward in this state so that the operation for selecting a new disc D is executed. When the next disc D to be selected is made approximately flush with the transfer plane L, the disc D is taken out and clamped as described above.

Next, the operation for inserting and discharging a disc D is executed in the state shown in FIG. 5. Here, the states of the respective disc supporting members 6, the disc driving unit II and the transfer mechanism III are entirely the same as those shown in FIG. 3, except that the shutter guide plate 5 which closed the disc inserting port 2 up to that time is rotated clockwise to be in a horizontal orientation as shown in FIG. 5.

When a disc D is transferred in the disc device, the transfer roller 21 and the confronting pad 26 are moved to the transfer position P4, P7 located on one side in the device so as to hold a disc D held in the disc accommodating unit I at the X2-side end thereof. As a result, the distance between the transfer roller 21 and the disc inserting port 2 is increased. Since the shutter guide plate 5 is made to be in a parallel orientation, a newly inserted disc D is guided by the shutter guide plate 5 to thereby prevent the X1-side edge of the disc D from falling below the lower side of the transfer roller 21. Further, although the interval between the transfer roller 21 and the disc supporting member 6 to which the disc D is transferred is also increased in the state shown in FIG. 5, the disc driving unit II is located therebetween and the turntable 12 and the damper 16 act as a guide for guiding the disc D. Accordingly, when the new disc D is inserted, it is reliably transferred onto the disc supporting member 6.

When the new disc D is to be inserted, an empty disc supporting member 6 (by which the disc D is intended to be held) is made flush with the transfer plane L by the selecting operation shown in FIG. 2 and thereafter the permit the disc D to be inserted through the disc inserting port 2. The inserted disc D is passed through the disc driving unit II by the transfer force of the transfer roller 21 and held on the empty disc supporting member 6. At this time, the disc D might not be moved up to the disc supporting member 6, but may be clamped between the turntable 12 of the disc driving unit II and the clamper 16 at the periphery of the center hole Da thereof and moved to the state shown in FIG. 4. In this state, information may be reproduced from or written to the disc D, and the disc D may be returned to the state shown in FIG. 5 after the completion of the reproduction or the recording and then discharged.

When still another disc D is to be further inserted after the above new disc D is held by the disc supporting member 6, the state of the disc device is switched to the state shown in FIG. 2 and another empty disc supporting member 6 is made flush with the transfer plane L. Then, the above state is switched to the state shown in FIG. 5 and a next disc D is held by the disc supporting member 6.

Whereas, when a disc D is to be discharged, the holding bracket 7 is moved upward or downward in the state shown in FIG. 2 to thereby make the disc D to be discharged flush with the transfer plane L. Thereafter, the state shown in FIG. 2 is switched to the state shown in FIG. 5 and the disc D is discharged through the disc inserting port 2. When another disc D is to be discharged thereafter, the state shown in FIG. 5 is switched to the state shown in FIG. 2, the disc D to be discharged is selected and then the state shown in FIG. 2 is switched to the state shown in FIG. 5.

Next, the detailed structures and operations of the respective components will be described with reference to FIG. 6 and subsequent figures.

(Structure and Operation of Disc Accommodating Unit I)

Figure 8:
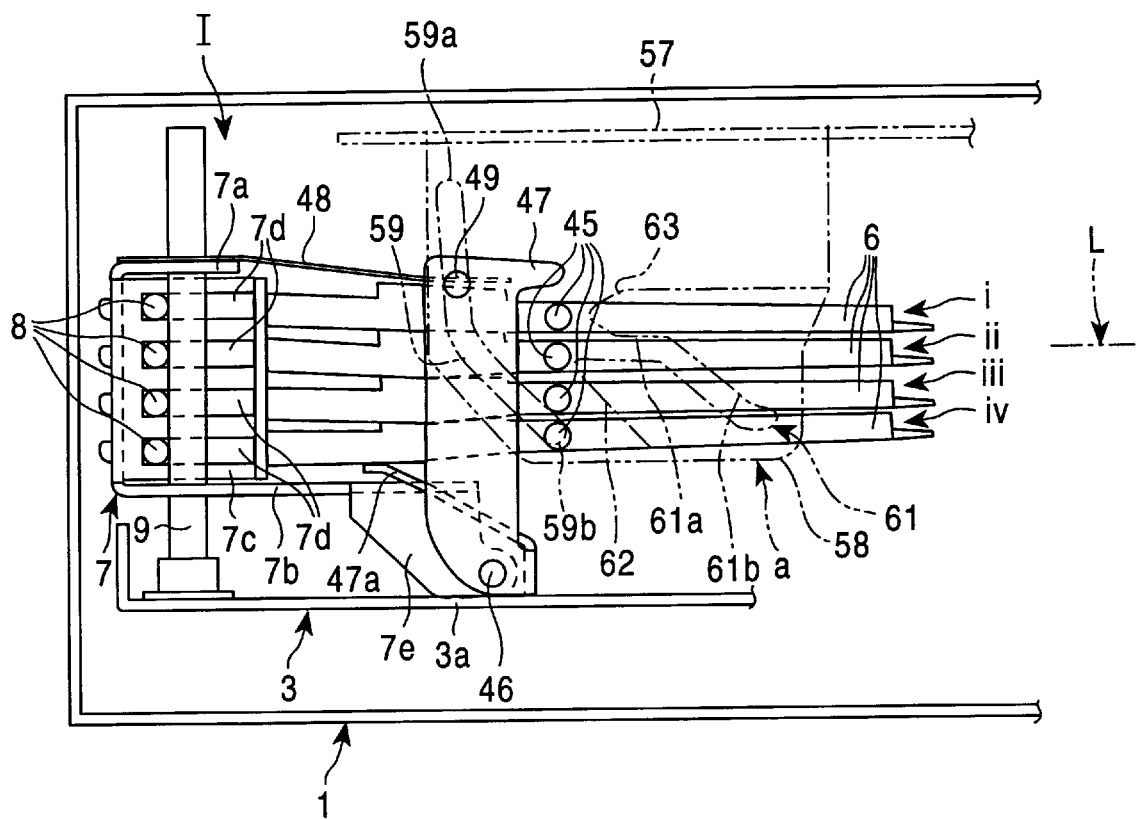
FIG. 8 is a partially enlarged side elevational view showing the state in which a second stage disc supporting member is selected.
Figure 9:
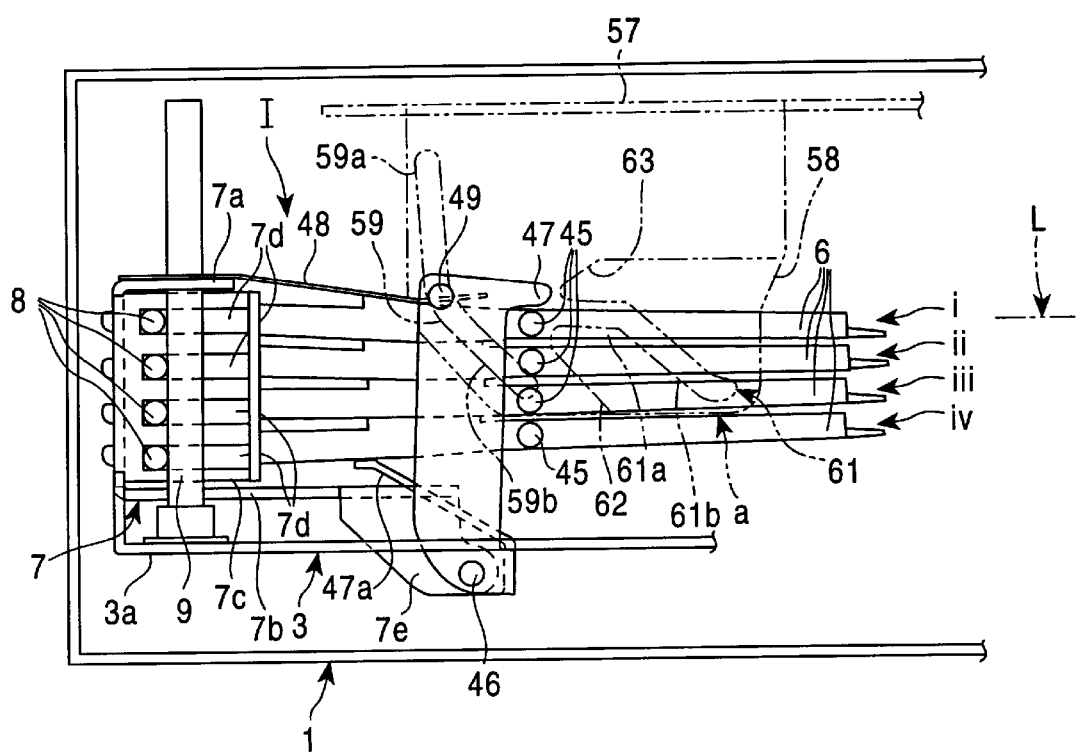
FIG. 9 is a partially enlarged side elevational view showing the state in which an uppermost stage disc supporting member is selected.
Figure 10:
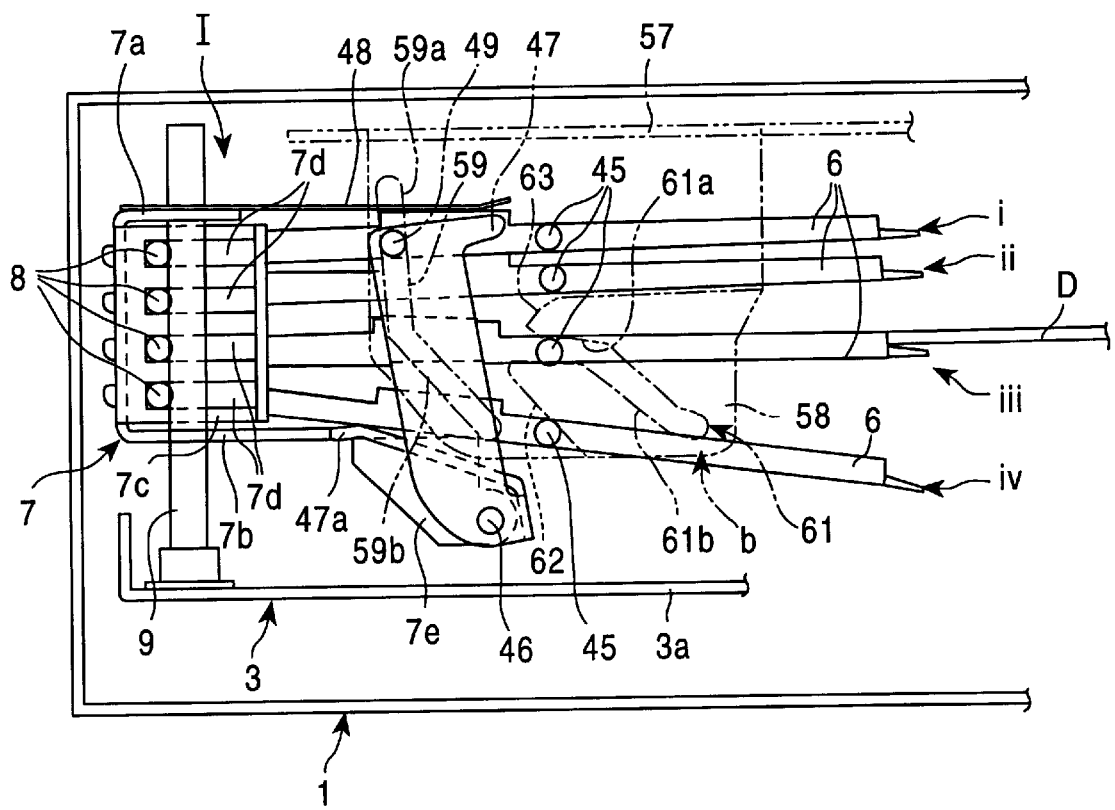
FIG. 10 is an enlarged side elevational view showing the state in which the third stage disc supporting member is selected and disc supporting members adjacent to it are spaced apart therefrom.
Figure 11:
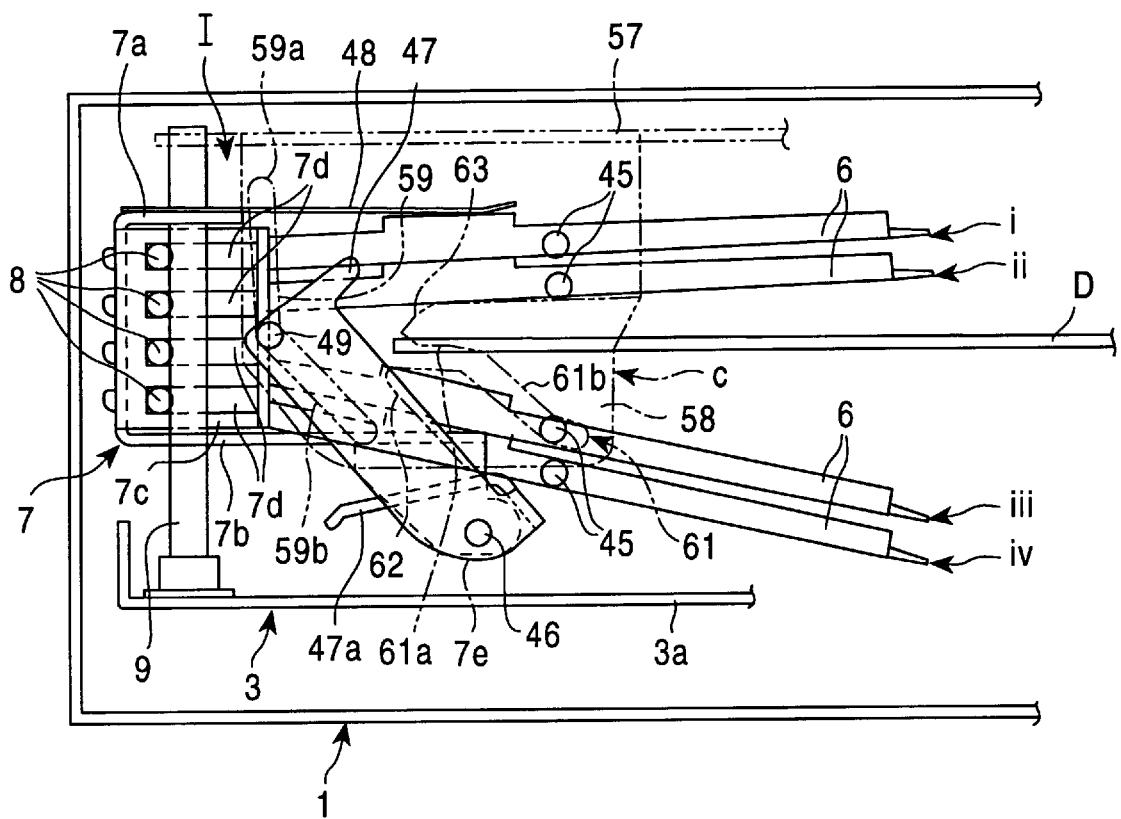
FIG. 11 is an enlarged side elevational view showing the state in which a selected disc supporting member is spaced apart from a disc.

FIG. 6 to FIG. 9 are side elevational views showing the upward/downward movement of the holding bracket 7 and the disc supporting members 6; FIG. 10 and FIG. 11 are side elevational views showing the operation for separating the disc supporting members 6; and FIG. 12 is a view in the direction of the arrow A in FIG. 1, showing the structure of a selective drive mechanism IV for moving the holding bracket 7 and the disc supporting member 6 upward and downward.

Figure 12:
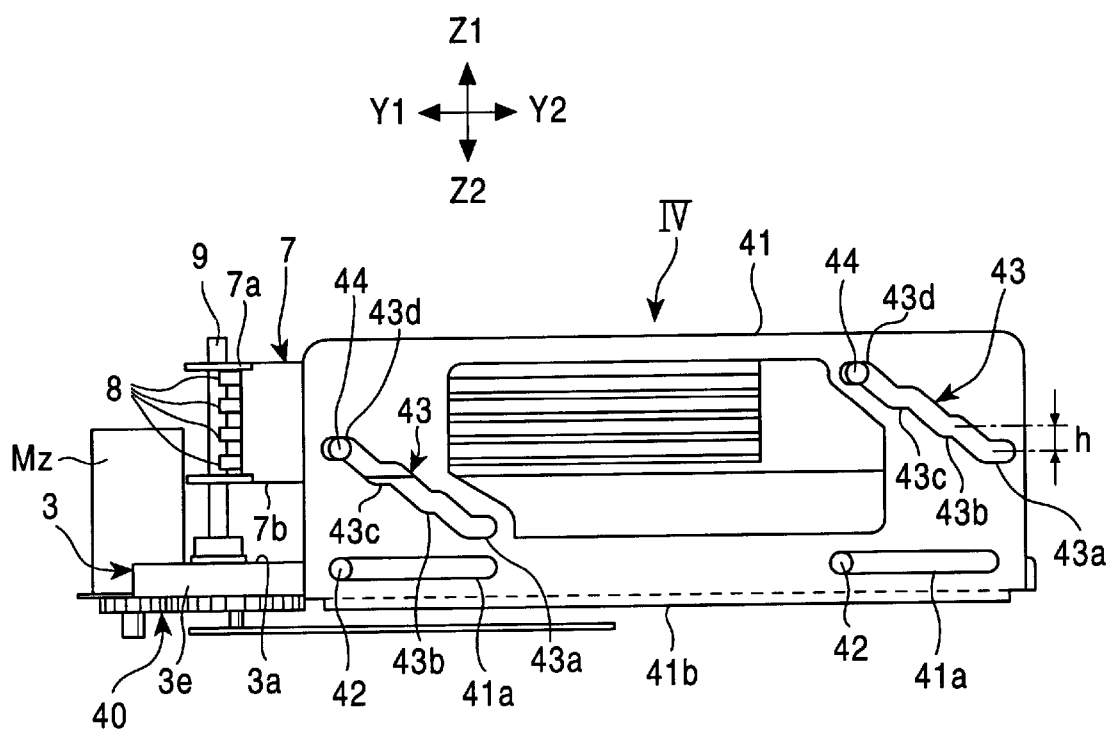
FIG. 12 is a rear elevational view in the direction of the arrow A in FIG. 1 showing a selective drive mechanism.

As shown in FIG. 12, the selective drive mechanism IV is provided with a lifting/lowering plate 41. Guide slots 41 a which extend in the Y-direction are formed in the lifting/lowering plate 41 and inserted around guide shafts 42 which are fixed to the rear bent piece 3c of the lower chassis 3 so that the lifting/lowering plate 41 can slide in the Y-direction.

A motor Mz is mounted on the lower chassis 3. The rotational force of the lifting/lowering motor Mz is reduced by a speed reduction gear train 40 and transmitted to a rack formed in the bent portion 41b which is formed at the lower end of the lifting/lowering plate 41. The lifting/lowering plate 41 is driven in the Y1–Y2 direction by the driving force. Lifting/lowering holes 43 are formed in the lifting/lowering plate 41, and sliding shafts 44 fixed to the holding bracket 7 are inserted into the respective lifting/lowering holes 43.

The respective lifting/lowering holes 43 are tilted and have horizontal step portions 43a, 43b, 43c, 43d formed in each of them. The sliding shafts 44 are slid in the respective lifting/lowering holes 43 by the moving force of the lifting/lowering plate 41 in the Y1–Y2 direction so that the holding bracket 7 and the disc supporting members 6 are thereby moved upward and downward. When the lifting/lowering plate 41 is moved in the Y2-direction and the sliding shafts 44 are located at the uppermost step portions 43d as shown in FIG. 12, the holding bracket 7 and the respective disc supporting members 6 are moved uppermost. At this time, the lowermost (iv) disc supporting member 6 is made flush with the height of the transfer plane L as shown in FIG. 6.

When the lifting/lowering plate 41 is driven in the Y1-direction from this position and the sliding shafts 44 are stopped at the step portions 43c, the holding bracket 7 and the disc supporting members 6 are slightly lowered and the third stage (iii) disc supporting member 6 is made flush with the height of the transfer plane L. When the sliding shafts 44 are located at the step portions 43b, the second (ii) stage disc supporting member 6 is made flush with the transfer plane L as shown in FIG. 8. When the sliding shafts 44 are located at the lowermost step portions 43a, the holding bracket 7 moves to the lowest position, and the uppermost (i) stage disc supporting member 6 is made flush with the height of the transfer plane L as shown in FIG. 9.

As shown in FIG. 1 and FIG. 6, selecting shafts 45 are fixed to the opposite sides of the respective disc supporting members 6 on the right and left sides thereof.

Further, supporting pieces 7e are bendingly formed to the sides of the lower bent piece 7b of the holding bracket 7, and the base ends of lift arms 47 are rotatably supported by a support shaft 46 fixed to the supporting pieces 7e. Lift pieces 47a are formed on the lift arms 47 integrally therewith so as to confront the lower surface of the lowermost stage (iv) disc supporting member 6. In addition, a sliding shaft 49 is fixed to the upper ends of the lift arms 47.

A pair of leaf springs 48 are supported by the upper end of the upper bent portion 7a of the holding bracket 7, and the uppermost (i) stage disc supporting member 6 is resiliently pressed downward by the leaf springs 48.

As shown in FIG. 1, the upper chassis 4a is provided with a switching drive unit V. The operation for selectively separating the respective disc supporting members 6, the moving and clamping operation of the disc driving unit II, and the switching operation of the transfer mechanism III are executed by the driving force of the switching drive unit V.

In the switching drive unit V, a disc cam 51 is supported on the lower surface of the upper chassis 4 so as to rotate about a shaft 52. A switching motor Md is supported on the upper chassis 4, and the power of the switching motor Md is transmitted to a gear formed in the outer periphery of the disc cam 51 through a speed reducing gear train (not shown) so that the disc cam 51 can be driven forward or rearward.

A plurality of cam holes (cam grooves) are formed in the disc cam 51 and control the moving positions of the respective components.

As shown in FIG. 1, a switching arm 53 is disposed on the lower surface of the upper chassis 4 and supported so as to rotate about a shaft 54 as a fulcrum. A follower pin 55 is fixed to the arm 53a of the switching arm 53, and is slidably inserted into the cam holes formed in the disc cam 51. A coupling pin 56 is disposed on the other arm 53b of the switching arm 53, and the switching arm 53 is coupled with a first switching plate 57 through the coupling pin 56. The first switching plate 57 is supported so as to slide in the X1–X2 direction in the upper chassis 4. When the disc cam 51 rotates, the first switching plate 57 is driven in the X1-direction and the X2-direction through the switching arm 53.

A pair of selecting members 58 are fixed on the lower surface of the first switching plate 57. FIG. 6–FIG. 11 show the relationship between the selecting members 58 and the disc accommodating unit 1.

As shown in FIG. 6, each of the selecting members 58 is provided with a slot-shaped orientation control cam 59. The orientation control cam 59 is composed of a control portion 59a which is slightly tilted with respect to a vertical line (Z-axis) and an escape portion 59b which is continuous with the lower end of the control portion 59a and tilted at a larger angle. The sliding shaft 49 fixed to the upper ends of the lift arms 47 is slidably inserted into the orientation control cams 59.

While the disc selecting operation shown in FIG. 2 is executed, the first switching plate 57 and the selecting members 58 stop at a standby position (a) shown in FIG. 6. In the disc selecting operation, the holding bracket 7 moves upward and downward along the guide shafts 9 in the Z1–Z2 direction such that the selecting members 58 stop at the standby position (a). At this time, the sliding shaft 49 disposed in the lift arms 47 always slides upward and downward in the control portions 59a of the orientation control cams 59 as shown in FIG. 6 to FIG. 9. Accordingly, the lift arms 47 rise in the Z1-direction, and the lowermost (iv) stage disc supporting member 6 is lifted by the lift pieces 47a formed integrally with the lift arms 47. Further, since the uppermost (i) disc supporting member 6 is pressed downward by the leaf springs 48, the four disc supporting members 6 come into intimate contact with each other.

The support shafts 8, which serve as the fulcrums of rotation of the respective disc supporting members 6, are disposed in the Z-direction at constant intervals h, whereas the respective disc supporting members 6 have a thickness smaller than the intervals h of the support shafts 8. Thus, the intervals between the disc supporting members 6 on the X2-side are narrower than the above intervals h on the base end side as shown in FIG. 2 and FIG. 6. Accordingly, when all the disc supporting members 6 hold discs D, the discs D are in intimate contact with each other so that the intervals between the edges thereof are narrower on the X2 side.

The height between the step portions of the lifting/lowering holes 43 formed in the lifting/lowering plate 41 of the selective drive mechanism IV shown in FIG. 12 coincides with the intervals h between the support shafts 8. The holding bracket 7 and the disc supporting members 6 are sequentially moved upward and downward by the same height as the intervals h of the support shafts 8 by the selective drive mechanism IV. On the other hand, the intervals between the X2-side edges of the discs D held by the disc supporting members 6 are narrower. Thus, when the holding bracket 7 is moved upward or downward by a pitch equal to the interval h in this state in order to select the disc D of any one of the disc supporting members 6, the disc held by the selected disc supporting member 6 moves to a selected position in a state that it is tilted with respect to the transfer plane L. As a result, there arises a problem that when the disc driving unit II is moved in the X1-direction as shown in FIG. 3, the X1-side edge of the selected disc D is liable to abut against the turntable 12, and the selecting shafts 45 cannot be reliably held by the selection cams 61 (see FIG. 6) formed in the selecting members 58.

To cope with the above problem, the control portion 59a of the orientation control cam 59 is formed such that its upper end is tilted toward the X1-side so that the respective disc supporting members 6 to be selected can be in an approximately horizontal orientation as shown in FIG. 6 to FIG. 9.

More specifically, as shown in FIG. 6, when the holding bracket 7 moves to the uppermost position and the disk D held by the lowermost stage (iv) disc supporting member 6 is selected, the sliding shaft 49 fixed to the upper ends of the lift arms 47 moves to the uppermost portion of the tilted control portions 59a of the orientation control cams 59. As a result, the lift arms 47 are in an orientation which is slightly rotated counterclockwise from a perfectly vertical orientation. At this time, the lowermost disc supporting member 6 which is lifted by the lift pieces 47a is in an approximately horizontal orientation, and the height thereof approximately coincides with the height of the transfer plane L.

Figure 7:
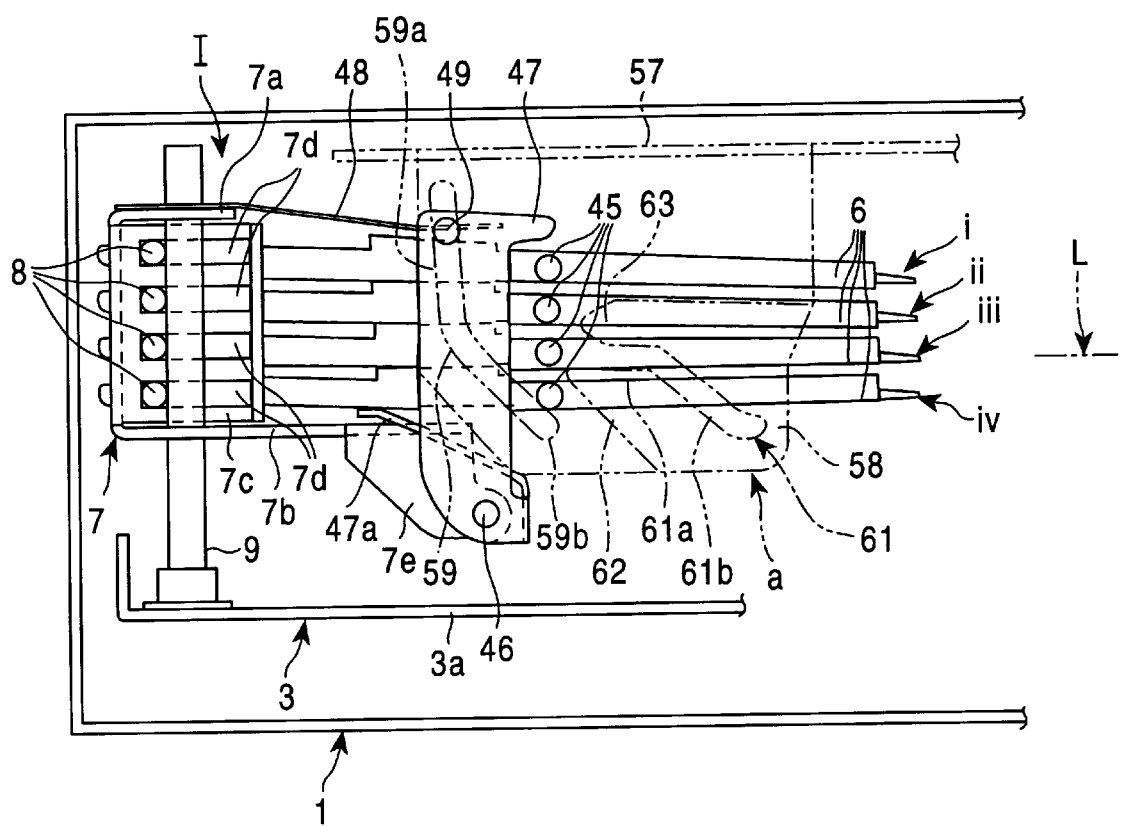
FIG. 7 is a partially enlarged side elevational view showing the state in which a third stage disc supporting member is selected.

When the third stage disc supporting member 6 is to be selected, the holding bracket 7 is located at the position shown in FIG. 7, which is reached when the holding bracket 7 is moved downward by the interval h between the support shafts 8. Thus, the sliding shaft 49 fixed to the upper end of the lift arms 47 is slightly lowered in the control portions 59a of the orientation control cams 59 from the state shown in FIG. 6. The lift arms 47 lowered to the position shown in FIG. 7 are slightly rotated clockwise from the orientation shown in FIG. 6 by the tilt of the control portions 59a, so that the lowermost stage (iv) disc supporting member 6 is slightly lifted by the lift pieces 47a. As a result, the third disc supporting member 6 is made to assume an approximately horizontal orientation that is flush with the transfer plane L.

FIG. 8 shows a state in which second stage (ii) disc supporting member 6 is to be selected. Here, the holding bracket 7 is slightly lowered from the position shown in FIG. 7. FIG. 9 shows a state in which the uppermost stage (i) disc supporting member 6 is to be selected. Here, the holding bracket 7 is further lowered from the position shown in FIG. 8. As the holding bracket 7 is lowered, the lift arms 47 are gradually rotated clockwise in accordance with the tilt angle of the control portions 59a of the orientation control cams 59. As a result, in FIG. 8, the disc supporting members 6 are lifted by the lift pieces 47a as a whole so that the second highest (ii) disc supporting member 6 is approximately horizontal when it is located at the height of the transfer plane L. In FIG. 9, the disc supporting members 6 are further lifted by the lift pieces 47a, so that the uppermost (i) disc supporting member 6 is approximately horizontal when it is located at the height of the transfer plane L.

As described above, the lowermost stage (iv) disc supporting member 6 is made to be approximately parallel, and all the disc supporting members 6 located above it are in an orientation tilted downward toward the X2 side. As shown in FIG. 7, FIG. 8 and FIG. 9, however, as the holding bracket 7 is lowered, the disc supporting members 6 are gradually lifted by the lift pieces 47a so that a disc supporting member 6 to be selected is made to be in a horizontal orientation.

From the above, as shown in FIG. 2, even if the intervals between the X2-side edges of the discs D, which are held by the respective disc supporting members 6, are narrower than the intervals h between the support shafts 8 and the respective discs D are tilted with the X2-side edges thereof being in contact with each other, when any one of the disc supporting members 6 is to be selected, the selected disc supporting member 6 can be made to always be in a horizontal orientation and confront the transfer plane L.

As shown in FIG. 6, the selection cams 61, each composed of a slot, are formed in the selecting members 58, and each of the selection cams 61 is composed of a horizontal portion 61a which extends in the X-direction and a tilted escape portion 61b which descends in the X1-direction. Further, an upper wedge-shaped separating cam 63 and a lower wedge-shaped separating cam 62 are formed at the horizontal portion 61a at the X1-side end thereof.

When the holding bracket 7 is moved upward or downward and one of the disc supporting members 6 (discs D) is selected as described above, the selected disc supporting member 6 is made to assume an approximately horizontal orientation at the position of the transfer plane L. Accordingly, the selecting shaft 45 fixed to the selected disc supporting member 6 is also made as high as the transfer plane L and confronts the horizontal portions 61a of the selection cams 61 at a position as high as the horizontal portions 61a on the X1-side. As a result, when the selecting members 58 located at the standby position (a) shown in FIG. 6 move in the X1-direction, the selecting shaft 45 of the selected disc supporting member 6 is reliably held in the horizontal portions 61a.

FIG. 10 and FIG. 11 show, as an example, a supporting member separating operation when the third state (iii) disc supporting member 6 is to be selected.

As shown in FIG. 7, after the third stage (iii) disc supporting member 6 is moved to a position as high as the transfer plane L by the upward/downward movement of the holding bracket 7, the switching arm 53 is moved counterclockwise by the rotation of the disc cam 51 of the switching drive unit V shown in FIG. 1 to thereby move the first switching plate 57 in the X1-direction. The selecting members 58 fixed to the first switching plate 57 are moved thereby to a selecting position (b) shown in FIG. 10 so that the selecting shaft 45 corresponding to the selected disc supporting member 6 is held by the horizontal portions 61a of the selection cams 61. The selecting shaft 45 corresponding to the second stage (ii) disc supporting member 6 which is located above the aforesaid disc supporting member 6 is lifted by the upper separating cams 63, whereas the selecting shaft 45 corresponding to the lowermost stage (iv) disc supporting member 6 which is located below the aforesaid disc supporting member 6 is rotated downward by the lower separating cams 62. At this time, the lowermost stage (iv) disc supporting member 6 is supported by the lift pieces 47a which are formed integrally with the lift arms 47.

As shown in FIG. 10, when the selecting members 58 are stopped at the selecting position (b), there are formed spaces above and below the selected third stage (iii) disc supporting member 6 and the disc D held thereby. This state is shown FIG. 3. At this time, the moving base 17 and the disc driving unit II are moved in the X1-direction, and the selected third stage (iii) disc D is located between the turntable 12 of the disc driving unit II and the damper 16. In addition, the arms 23a, 23b of the transfer mechanism III are rotated clockwise and reach the transfer position P4, and the confronting pad 26 is lowered to the transfer position P7. Then, the disc D clamped between transfer roller 21 and the confronting pad 26 is taken out in the X2-direction, and the center hole Da of the disc D coincides with the center of the turntable 12.

Thereafter, the first switching plate 57 is further driven in the X1-direction by the rotation of the disc cam 51 shown in FIG. 1 and the selecting members 58 reach a separating position (c) shown in FIG. 11 and is stopped there. At this time, the lift arms 47 are further rotated counterclockwise by the orientation control cams 59, and the lowermost stage (iv) disc supporting member 6 is greatly rotated clockwise accordingly. In addition, the selecting shaft 45 corresponding to the third stage (iii) disc supporting member 6 on which the selected disc D is loaded is guided in the tilt escape portions 61b of the selection cams 61, so that the third stage (iii) disc supporting member 6 is greatly rotated clockwise and separated from the lower surface of the disc D.

This is the driving state shown in FIG. 4, wherein the disc D is free and is clamped on the turntable 12.

(Structure and Operation of Transfer Mechanism III)

Figure 13A:
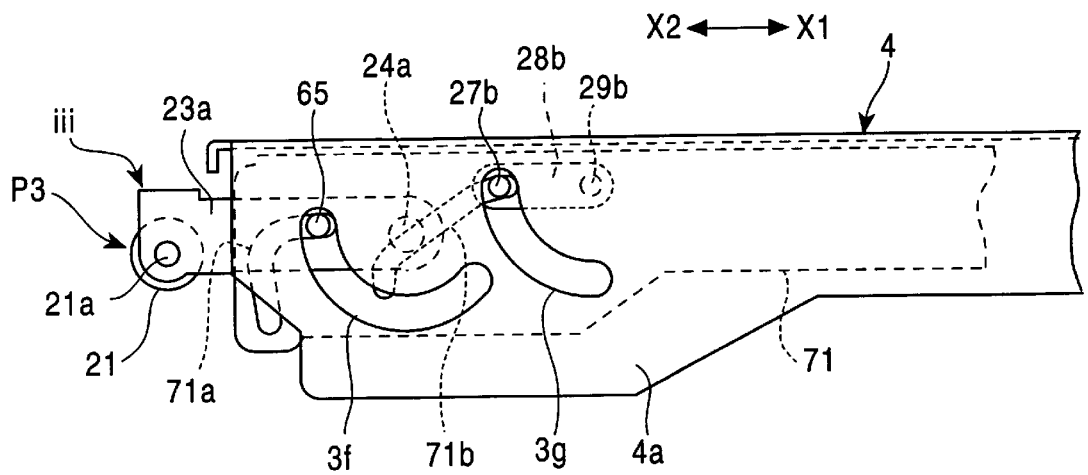
FIG. 13A and FIG. 13B are partially enlarged side elevational views in the direction of the arrow B in FIG. 1 showing an operation for switching a transfer mechanism, respectively.
Figure 13B:
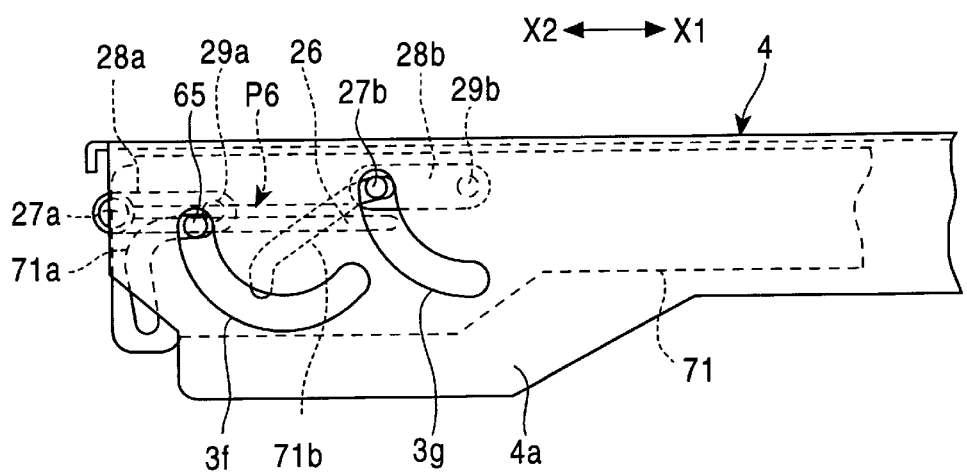

FIG. 13A and FIG. 13B, which are partial side elevational views in the direction of the arrow B in FIG. 1, show the transfer mechanism III and the switching portion thereof.

As shown in FIG. 13A and FIG. 13B, arc-shaped holes 3f and 3g are formed in the X2-side extreme end of the right side plate 4a of the upper chassis 4. The arc-shaped hole 3f is formed along an arc having a prescribed radius about the support shafts 24a, 24b of the arms 23a, 23b of the transfer mechanism III. A shaft 65 disposed on one of the arms or the arm 23a is movably inserted into the arc-shaped hole 3f. The other arc-shaped hole 3g is formed along an arc locus having a prescribed radius about the shaft 29a which supports the link 28b of the transfer mechanism III. FIG. 13A shows only the arm 23a and the transfer roller 21 of the transfer mechanism III, and FIG. 13B shows only the confronting pad 26 and the links 28a, 28b.

As shown in FIG. 1, a second switching plate 71 is supported on the switching drive unit V so as to be slid in the X1–X2 direction and driven in the X1–X2 direction, by the cam holes formed in the disc cam 51. A curved driving slot 71a having a shape shown in FIG. 13A and FIG. 13B and a curved driving slot 71b having a shape also shown in FIG. 13A and FIG. 13B are formed in the switching plate 71.

The shaft 65 disposed on the arm 23a passes through the driving slot 71a and is inserted into the arc-shaped hole 3f. A shaft 27b which couples the link 28b with the confronting pad 26 passes through the driving slot 71b and is inserted into the arc-shaped hole 3g.

In FIG. 13A and FIG. 13B, the second switching plate 71 is moved in the X2-direction, and the shaft 65 and the shaft 27b are lifted up to the upper ends of the arc-shaped holes 3f and 3g by the driving slots 71a, 71b of the second switching plate 71. Accordingly, the arms 23a, 23b are rotated upward so that the transfer roller 21 is located at the standby position P3 at the upper portion of the disc driving unit II as shown in FIG. 2, and the confronting pad 26 is likewise lifted and located at the standby position P6 shown in FIG. 2.

Figure 14:
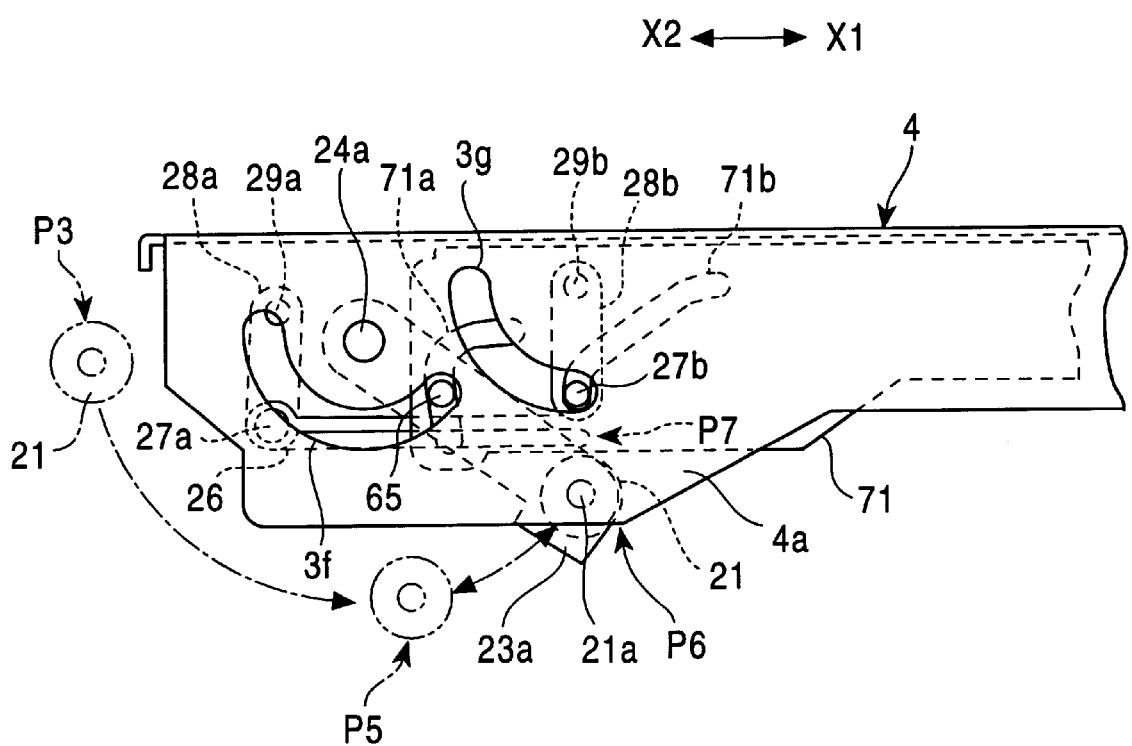
FIG. 14 is a partially enlarged side elevational view showing the state in which the transfer mechanism is switched to a disc transfer position.

When the above operation shifts to the disc removal operation shown in FIG. 3, the second switching plate 71 is driven by the disc cam 51 in the X1-direction and reaches the position shown in FIG. 14.

At this time, the shaft 65 and the shaft 27b are pulled in the X1-direction by the driving slots 71a, 71b formed in the second switching plate 71. Then, the shaft 65 and the shaft 27b move along the arc-shaped holes 3f, 3g. As a result, the transfer roller 21 reaches the transfer position P4. The confronting pad 26 is also moved parallel to itself by the links 28a, 28b which constitute the parallel link and likewise reaches the transfer position P7. The transfer roller 21, after having reached the transfer position P4, is resiliently pressed against a disc D by a spring force so that the disc D is clamped between the transfer roller 21 and the confronting pad 26.

When the disc driving state shown in FIG. 4 is attained, the second switching plate 71 is slightly returned in the X2 direction from the position shown in FIG. 14, the transfer roller 21 is moved to the standby position P5 by the rotation of the arms 23a, 23b, and at the same time the confronting pad 26 is slightly lifted and reaches the retreating position P8.

(Movement and Clamping Operation of Disc Driving Unit II)

Figure 15:
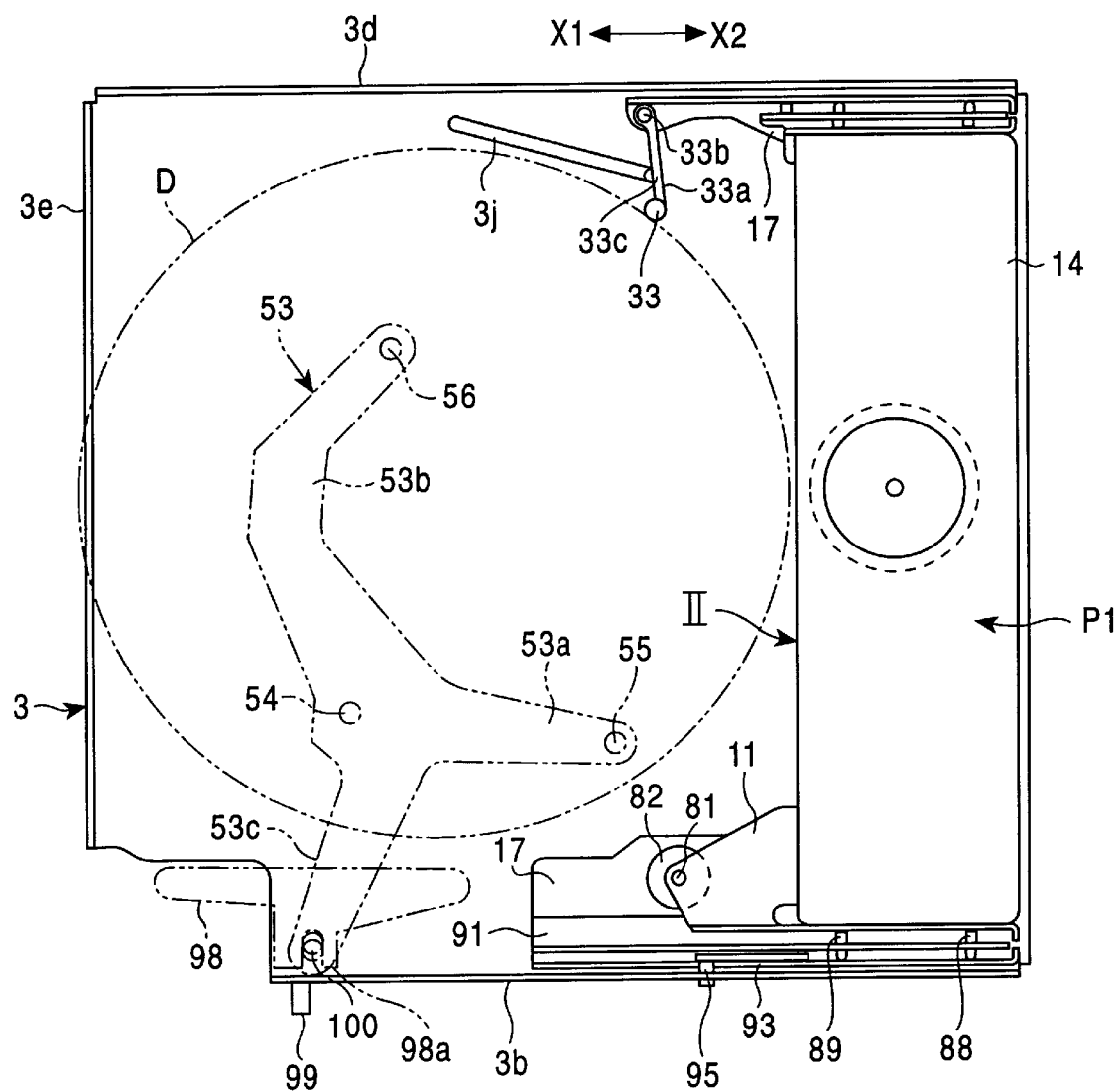
FIG. 15 is a plan view showing the state in which a disc driving unit is located at a standby position.
Figure 16:
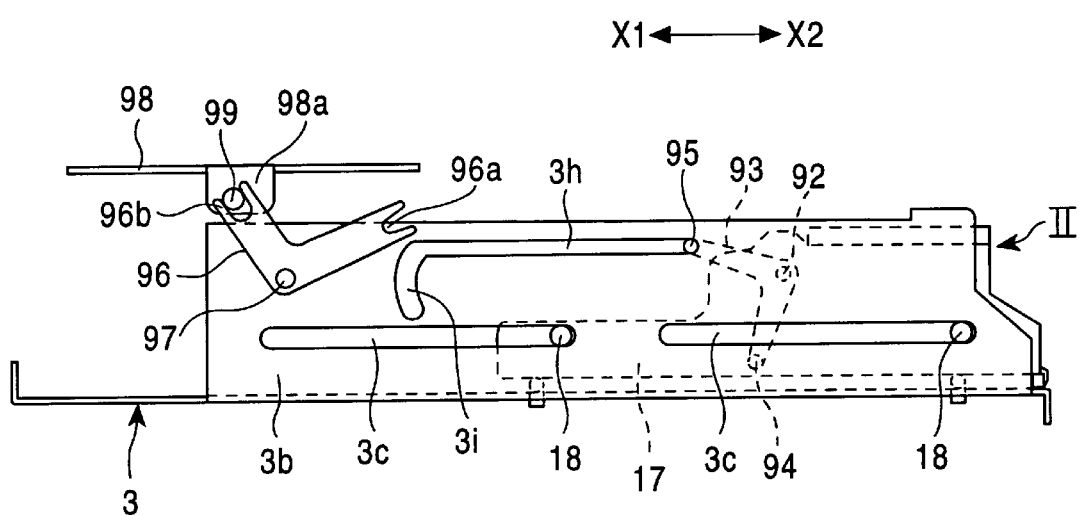
FIG. 16 is a side elevational view of FIG. 15.
Figure 17:
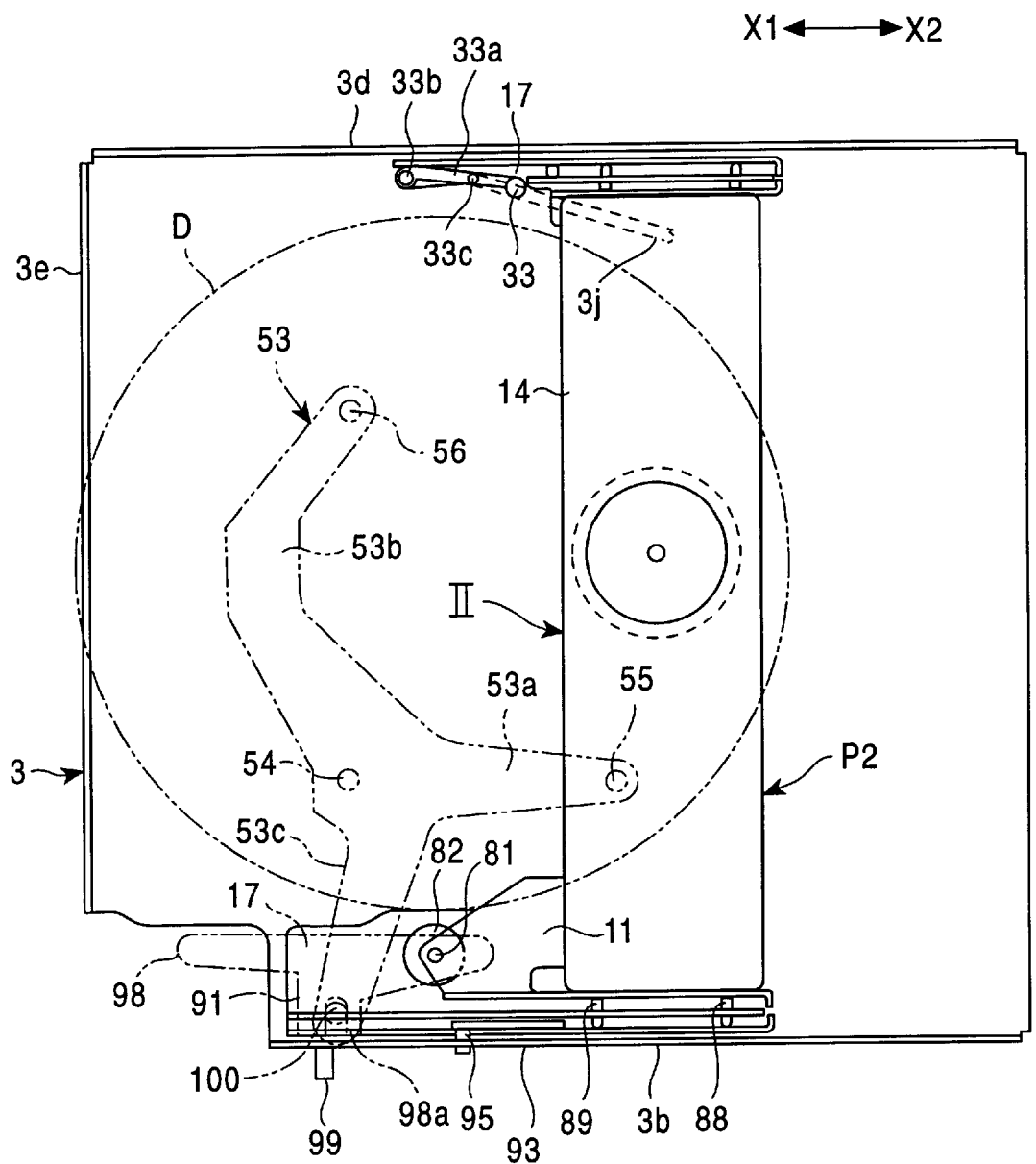
FIG. 17 is a plan view showing the state in which the disc driving unit moves to a driving position.
Figure 18:
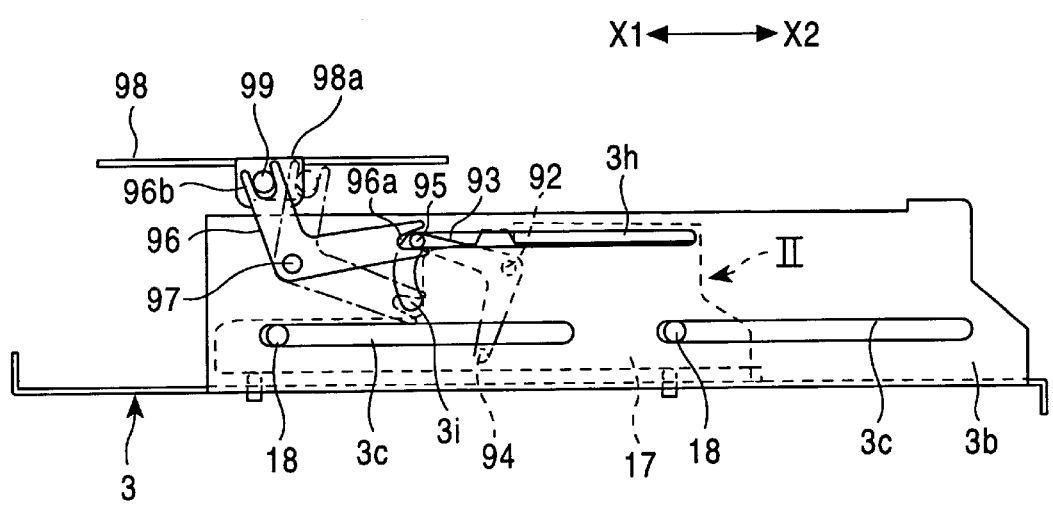
FIG. 18 is a side elevational view of FIG. 17.
Figure 19A:
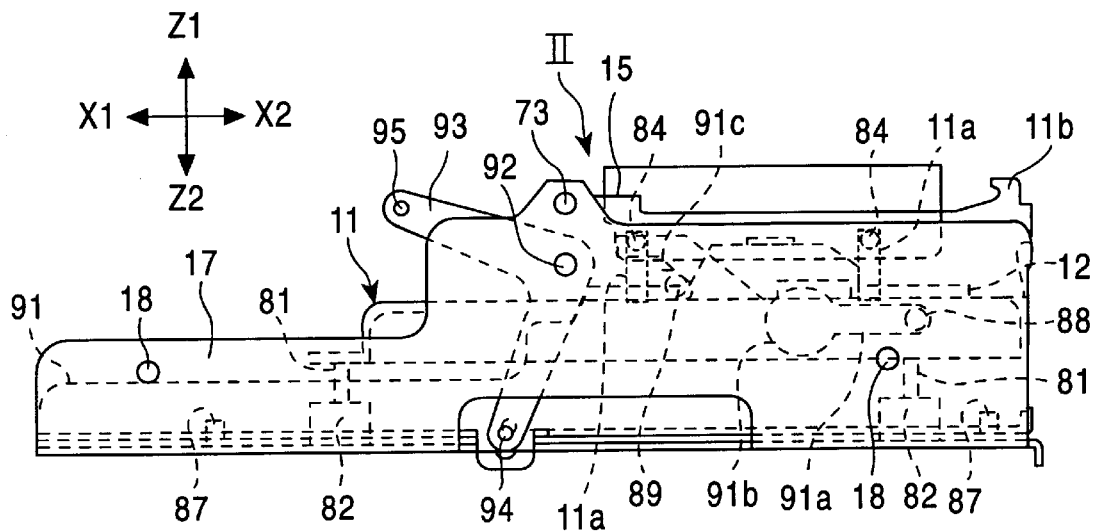
FIG. 19A, FIG. 19B and FIG. 19C are side elevational views showing the disc driving unit when a disc is not clamped by it, respectively.
Figure 19B:
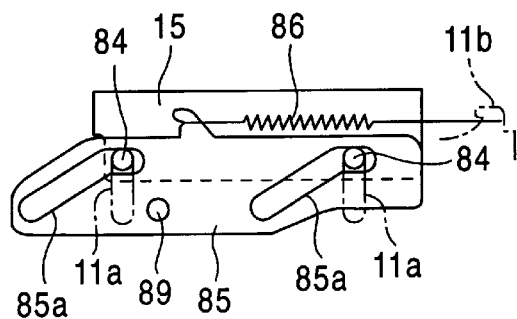
Figure 19C:
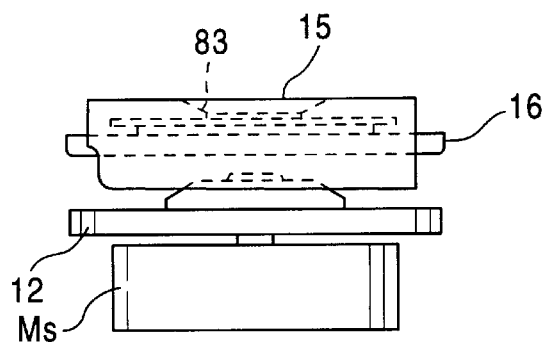
Figure 20A:
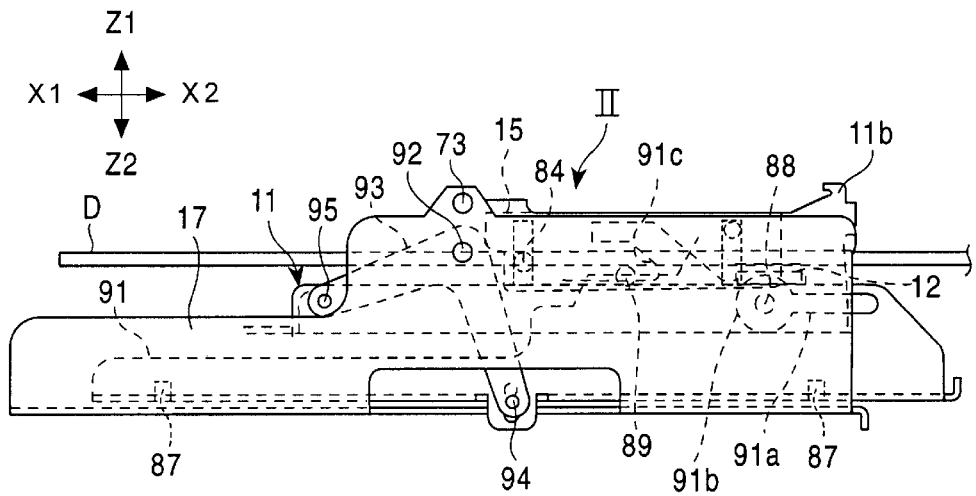
FIG. 20A, FIG. 20B and FIG. 20C are side elevational views showing the disc driving unit when a disc is clamped by it, respectively.
Figure 20B:
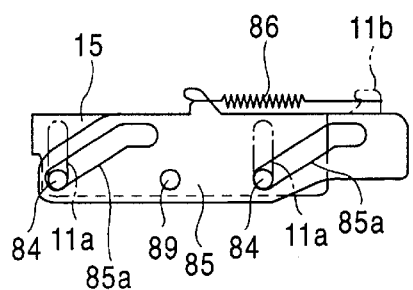
Figure 20C:
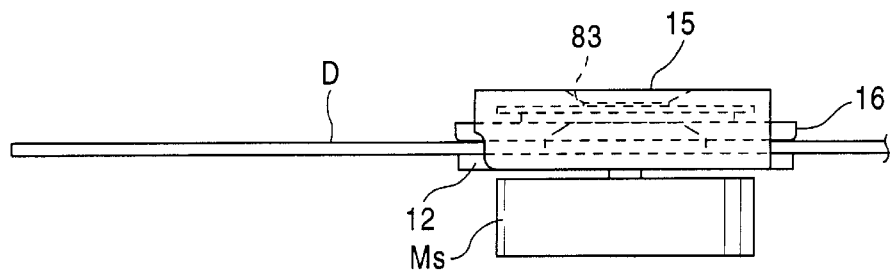

FIG. 15 is a plan view when the disc driving unit II is located at the standby position P1, FIG. 16 is a side elevational view at the same time, FIG. 17 is a plan view when the disc driving unit II moves to the driving position P2, FIG. 18 is a side elevational view at the same time, FIG. 19A, FIG. 19B and FIG. 19C are side elevational views showing the respective components when the disc driving unit II does not clamp a disc, and FIG. 20A, FIG. 20B and FIG. 20C are side elevational views showing the respective components when the disc driving unit II clamps a disc.

As shown in FIG. 1, the moving base 17 on which the disc driving unit II is mounted can be moved on the lower chassis 3 in the X1–X2 direction, and drive engaging pins 73 are fixed to the moving base 17.

As shown in FIG. 1, a third switching plate 72 is disposed on the lower surface of the upper chassis 4 and also driven in the X1–X2 direction by the cam holes formed in the disc cam 51. A driving groove 72a is formed in a side of the third switching plate 72, and the drive engaging pins 73 are always engaged with the driving groove 72a. Therefore, when the third switching plate 72 is driven in the X1–X2 direction by the cam holes (or cam grooves) formed in the disc cam 51, the moving base 17 is driven in the X1–X2 direction by the third switching plate 72 to thereby move the disc driving unit II mounted on the moving base 17 between the standby position PI shown in FIG. 2 and the driving position P2 shown in FIG. 3 to FIG. 5.

FIG. 19A, FIG. 19B and FIG. 19C show the structure of the disc driving unit II in more detail.

FIG. 1 and FIG. 2 show the drive chassis 11 on which the turntable 12, the spindle motor Ms, the optical head 13 and so on are mounted. As shown in FIG. 19A, support shafts 81 are fixed to the lower end of the drive chassis 11 and supported by resilient support members 82 such as an oil damper or the like disposed on the bottom of the moving base 17. The drive chassis 11 is resiliently supported on the moving base 17.

The clamp support member 15 is disposed on the lower surface of the support frame 14 which covers the upper portion of the disc driving unit II as shown in FIG. I and the damper 16 is supported by the clamp support member 15 as shown in FIG. 2. FIG. 19C shows the side elevational view of the clamp support member 15, wherein the damper 16 is rotatably supported by the clamp support member 15 and can be resiliently pressed in the direction of the turntable 12 by a leaf spring 83.

As shown in FIG. 19A and FIG. 19B, sliding shafts 84 are fixed to a side of the clamp support member 15 and are slidably inserted into the slots 11a which are formed in a side plate of the drive chassis 11 and extend in the Z-direction, whereby the clamp support member 15 is supported so as to move upward and downward with respect to the drive chassis 11.

A clamp driving member 85 is supported inside of the side plate of the drive chassis 11, so as to move only in the X1–X2 direction. A clamp spring 86 is stretched between the clamp driving member 85 and a spring hook 11b at the upper end of the drive chassis 11, and the clamp driving member 85 is always urged in the X2-direction by the clamp spring 86. As shown in FIG. 19B, tilt drive holes 85a are formed in the clamp driving member 85, and the sliding shafts 84 disposed on the clamp support member 15 are inserted into the tilt drive holes 85a. Therefore, the clamp support member 15 is moved upward and downward by the moving force of the clamp driving member 85 in the X1–X2 direction.

Further, support shafts 87 are fixed to the bottom of the moving base 17, and a locking member 91 disposed on the bottom plate of the moving base 17 is guided by the support shafts 87 and supported on the moving base 17 so as to slide in the X1–X2 direction. A locking groove 91a and a free hole 91b continuous to the locking groove 91a are formed in a side plate of the locking member 91, and a V-shaped press portion 91c is formed in the left side of the locking member 91 in the Figure. A locking pin 88 is disposed on a side of the drive chassis 11 and inserted into the locking groove 91a and the free hole 91b. Further, as shown in FIG. 19B, a pin 89 is fixed to the clamp driving member 85 and can be pressed by the press portion 91c.

A driving arm 93 is rotatably supported by a support arm 92 inwardly of a side plate of the moving base 17. The lower end of the driving arm 93 is coupled with the locking member 91 by a coupling pin 94, and the locking member 91 is driven in the X1–X2 direction by the rotation of the driving arm 93.

A driving pin 95 is disposed on the upper end of the driving arm 93. As shown in FIG. 1 and FIG. 16, a guide hole 3h extending in the X1–X2 direction is formed in the side plate 3b of the lower chassis 3, and the driving pin 95 is slidably inserted into the guide hole 3h. In addition, an arc-shaped rotation hole 3i is continuously formed to the guide hole 3h at the X1-side end thereof.

As shown in FIG. 1 and FIG. 16, a transfer arm 96 is rotatably supported by a shaft 97 at the X1-side end of the side plate 3b of the lower chassis 3. A driving groove 96a is formed in the extreme end of an arm portion of the transfer arm 96 and can be engaged with the driving pin 95 disposed on the driving arm 93. In addition, a transfer groove 96b is formed in the extreme end of the other arm portion of the transfer arm 96.

As shown in FIG. 1 and FIG. 15, a driving slider 98 is supported on the Y2-side edge of the upper chassis 4 so as to slide in the X1–X2 direction and is coupled to the extreme end of the arm portion 53c of the switching arm 53 by a coupling pin 100. A transfer pin 99 is fixed to the bent piece 98a of the driving slider 98 and is always engaged with the transfer groove 96b of the transfer arm 96.

As shown in FIG. 15 and FIG. 16, when the moving base 17 and the disc driving unit II move to the standby position P1, the driving pin 95 disposed on the driving arm 93 is located in the guide hole 3h. At this time, the driving arm 93 is rotated clockwise, and the locking member 91 is moved in the X1-direction by the coupling pin 94 as shown in FIG. 16 and FIG. 19A. The locking pin 88 fixed to the drive chassis 11 is restricted to the X2-side end of the locking groove 91a formed in the locking member 91, so that the drive chassis 11 is restricted without moving on the moving base 17. Further, the pin 89 fixed to the clamp driving member 85 is pressed in the X1-direction by the press portion 91c formed to the locking member 91, and the clamp driving member 85 is moved in the X1-direction with respect to the drive chassis 11. Thus, the sliding shafts 84 are lifted in the Z1-direction by the tilt drive holes 85a formed in the clamp driving member 85. Accordingly, the clamp support member 15 is lifted, and the damper 16 supported by the clamp support member 15 separates from the turntable 12 upward as shown in FIG. 19C.

In FIG. 15, the switching arm 53 is rotated clockwise, the first switching plate 57 (see FIG. 1) which is driven by the switching arm 53 is moved in the X2-direction at the same time, and the selecting members 58 fixed to the first switching plate 57 are located at the standby position (a) shown in FIG. 6 to FIG. 9. This is the state shown in FIG. 2.

Since the switching arm 53 is rotated clockwise, the driving slider 98 coupled with the arm portion 53c of the switching arm 53 is moved in the X1-direction and the transfer arm 96 is moved counterclockwise as shown in FIG. 16.

When the operating state of the disc device shifts to the disc driving state, the switching arm 53 is driven counterclockwise by the disc cam 51, as shown in FIG. 17, to thereby move the first switching plate 57 in the X1 direction. The selecting members 58 reach the position shown in FIG. 10, so that the disc supporting members 6 located above and below the disc supporting member 6 by which the selected disc D is held are separated to an upper side and a lower side as shown in FIG. 3. At this time, the driving slider 98 coupled with the switching arm 53 is moved to the position shown in FIG. 17 and FIG. 18, and the transfer arm 96 supported by the side plate 3b of the lower chassis 3 is rotated clockwise.

When the moving base 17 and the disc driving unit II are moved in the X1-direction in the state shown in FIG. 3, the driving pin 95 of the driving arm 93 disposed on the moving base 17 is moved to the X1-side terminal end of the guide hole 3h, and the driving pin 95 engages the drive groove 96a of the transfer arm 96 as shown in FIG. 18.

When the operating state of the disc device shifts to the disc driving state, the switching arm 53 is further rotated counterclockwise from the position shown in FIG. 17 to thereby drive the first switching plate 57 in the X1-direction. As a result, the selecting members 58 fixed to the first switching plate 57 are moved to the separating position (c) shown in FIG. 11, and the third stage (iii) disc supporting member 6 which supported the selected disc D, for example, is rotated downward.

At this time, the driving slider 98 is driven in the X2-direction by the counterclockwise rotation of the switching arm 53 to thereby rotate the transfer arm 96 clockwise as shown in broken line in FIG. 18. As a result, the driving pin 95 disposed in the driving arm 93 is moved downward in the rotation hole 3i, and the driving arm 93 is rotated counterclockwise.

When the driving arm 93 is rotated counterclockwise, the locking member 91 is driven by the driving arm 93 in the X2-direction on the moving base 17 as shown in FIG. 20A. The locking pin 88 disposed on the drive chassis 11 is removed thereby from the locking groove 91a formed in the locking member 91 and is located in the free hole 91b, and the press portion 91c of the locking member 91 is separated from the pin 89. Accordingly, the drive chassis 11 is in a free state and resiliently supported on the moving base 17 by the resilient support members 82 such as the oil damper or the like.

When the press portion 91c is further separated from the pin 89 in the X2-direction, the clamp driving member 85 to which the pin 89 is fixed is driven in the X2-direction by the clamp spring 86. At this time, the clamp support member 15 is lowered by the tilt drive holes 85a formed in the clamp driving member 85, so that the center hole Da of the selected disc D is clamped between the damper 16 supported by the clamp support member 15 and the turntable 12 as shown in FIG. 20C.

Accordingly, when the disc device is used as, for example, an on-vehicle disc device, the disc D is driven by the turntable 12 while the drive chassis 11 is not adversely affected by the vibration of the vehicle body, and information is recorded to or read from the disc D through the optical head 13. This is because the drive chassis 11 is supported by the resilient support members 82 in the driving state shown in FIG. 4.

Next, as shown in FIG. 1, the regulating member 33 is supported on the moving base 17. As shown in FIG. 15, an arm 33a is formed integrally with the regulating member 33, and the base end of the arm 33a is supported by a support shaft 33b so as to rotate on the Y1-side of the bottom plate of the moving base 17. In addition, a guide hole 3j is formed in the bottom plate 3a of the lower chassis 3, and a guide pin 33c that extends downward from the arm 33a is inserted into the guide hole 3j.

With the above arrangement, when the moving base 17 and the disc driving unit II are moved to the standby position P1 and the arm 33a is rotated clockwise, the regulating member 33 confronts the outside periphery of the disc D so that the removal of the discs D, which are supported by the respective disc supporting members 6, in the X2-direction is regulated as shown in FIG. 1 and FIG. 15.

On the other hand, when the moving base 17 and the disc driving unit age II are moved to the driving position P2 in the X1 direction, the support shaft 33b is moved in the X1-direction while the guide pin 33c is guided in the guide hole 3j as shown in FIG. 17. Accordingly, the arm 33a is rotated counterclockwise on the moving base 17, and the regulating member 33 is moved to the side of the disc D so that the disc D supported by the disc supporting member 6 can be taken out in the X2-direction.

As described above, according to the present invention, when a disc selecting operation and the like are carried out, the disc driving unit and the transfer mechanism stand by in the state that they are overlapped with each other. Thus, the disc device of the present invention can more effectively use the space in the cabinet as compared with a disc device in which a disc driving unit and a transfer mechanism are disposed in the same plane at all times. In addition, since the disc driving unit is moved to a driving position where it is overlapped with the discs in the disc accommodating unit I, the withdrawal amount of a selected disc which is taken out from the disc accommodating unit I can be reduced.

Since the size of the cabinet of the disc device can be reduced thereby, it is possible to accommodate and operate various mechanisms such as the disc accommodating unit, the disc driving unit, the transfer mechanism and the like in a cabinet of, for example, the 1 DIN size.

What is claimed is:

1. A disc device, comprising:

a disc accommodating unit for accommodating a plurality of discs;

a transfer mechanism for withdrawing a disc from said disc accommodating unit; and a disc driving unit capable of moving between a standby position where it is not overlapped with the discs accommodated in said disc accommodating unit and a driving position where it is overlapped with the discs accommodated in said disc accommodating unit for driving any one of the discs accommodated therein for reading or writing, wherein when said disc driving unit is located at the standby position, said transfer mechanism stands by at a position where it is overlapped with said disc driving unit, and when said disc driving unit is located at the driving position, said transfer mechanism moves to a position where it is not overlapped with said disc driving unit and can transfer any one of the discs accommodated in said disc accommodating unit to the disc driving unit located at the driving position for driving the disc.

2. A disc device according to claim 1, wherein when said disc driving unit moves from the standby position to the driving position, the transfer mechanism moves to the region which was occupied by said disc driving unit at the standby position and transfers any one of the discs accommodated in said disc accommodating unit.

3. A disc device according to claim 1, comprising a selective drive mechanism for moving said disc accommodating unit in a direction in which the discs are disposed, wherein when said disc driving unit is located at the standby position and said transfer mechanism is located at the position where it is overlapped with said disc driving unit, said disc accommodating unit is moved by said selective drive mechanism and a selected disc in said disc accommodating unit is moved to a position where it can be loaded on said disc driving unit.

4. A disc device according to claim 1, wherein:

said transfer mechanism includes a transfer roller for applying a transfer force to a disc and a confronting member for clamping the disc between said transfer roller and said confronting member;

at least one of said transfer roller and said confronting member is supported by rotatably disposed arms; and when said transfer mechanism is located at the position where it is overlapped with said disc driving unit, both of said transfer roller and said confronting member are located on one side of a disc transfer plane, whereas when a disc is transferred by said transfer mechanism, said arms are rotated so as to move said roller and said confronting member to positions where they confront each other across the disc transfer plane.

5. A disc device according to claim 4, wherein the other of said transfer roller and said confronting member which is not supported by said arms is supported by rotatably disposed parallel links and moved by the rotation of said parallel links to a position where a disc can be clamped between said transfer roller and said confronting member.

6. A disc device according to claim 4, wherein said transfer roller and said confronting member are simultaneously moved by the driving force of the same drive source from a position where they are overlapped with said disc driving unit to a position where they are not overlapped with said disc driving unit and can transfer any one of the discs in said disc accommodating unit.

7. A disc device, comprising:

a cabinet;

a disc inserting port formed in said cabinet;

a disc accommodating unit disposed in said cabinet and having a plurality of discs accommodated therein;

a transfer mechanism for transferring discs inserted through said disc inserting port to respective disc supporting members provided in said disc accommodating unit; and a disc driving unit capable of moving between a standby position where it is not overlapped with the discs accommodated in said disc accommodating unit and a driving position where it is overlapped with the discs accommodated in said disc accommodating unit for driving any one of the discs accommodated therein for reading or writing, wherein when said disc driving unit is located at the standby position, said transfer mechanism stands by at a position where it is overlapped with said disc driving unit, and when said disc driving unit is located at the driving position, said transfer mechanism moves to a position where it is not overlapped with said disc driving unit and can transfer a disc between said disc inserting port and any one of said disc supporting members and can transfer a disc to the disc driving unit located at the driving position for driving the disc.

8. A disc device according to claim 7, wherein when said disc driving unit moves from the standby position to the driving position, said transfer mechanism moves to the region which was occupied by said disc driving unit at the standby position and can transfer a disc.

9. A disc device, comprising:

a cabinet;

a disc inserting port formed in said cabinet;

a disc accommodating unit which is disposed in said cabinet and in which a plurality of discs are accommodated;

a transfer mechanism for transferring the discs inserted through said disc inserting port to respective supporting members provided in said disc accommodating unit; and a disc driving unit capable of moving between a standby position where it is not overlapped with the discs accommodated in said disc accommodating unit and a driving position where it is overlapped with the discs accommodated in said disc accommodating unit for driving any one of the discs accommodated therein for reading or writing, wherein when said disc driving unit is located at the standby position, said transfer mechanism stands by at a position where it is overlapped with said disc driving unit, and when said disc driving unit moves from the standby position to the drive position, said transfer mechanism moves to the region which was occupied by said disc driving unit at the standby position and can transfer a disc between said disc inserting port and said disc accommodating unit and can transfer a disc to the disc driving unit located at the driving position for driving the disc.

10. A disc device according to claim 7 or claim 9, comprising a selective drive mechanism for moving said disc accommodating unit in a direction in which the discs are disposed, wherein when said disc driving unit is located at the standby position and said transfer mechanism is located at the position where it is overlapped with said disc driving unit, said disc accommodating unit is moved by said selective drive mechanism and a selected disc in said disc accommodating unit is moved to a position where it can be loaded on said disc driving unit.

11. A disc device according to claim 10, wherein when said disc driving unit moves to the driving position, said transfer mechanism moves to a position where it can transfer the selected disc in said disc accommodating unit to said disc driving unit, at which time the selected disc, said disc driving unit, and said transfer mechanism are located at positions where they are placed in line with said disc inserting port.

12. A disc device according to claim 7 or claim 9, wherein the standby position of said disc driving unit is a space formed between the discs accommodated in said disc accommodating unit and said disc inserting port.

13. A disc device according to claim 12, wherein said disc driving unit is provided with a turntable on which a disc is loaded and turned, and when said disc driving unit is located at the standby position, the distance between the center of rotation of said turntable and said disc inserting port is less than the radius of the disc.

14. A disc device according to claim 7 or claim 9, wherein when said disc driving unit is located at the driving position, said transfer mechanism moves to a position where it can transfer either a disc inserted through said disc inserting port or a disc accommodated in said disc accommodating unit.

15. A disc device according to claim 7 or claim 9, wherein:
   said transfer mechanism includes a transfer roller for applying a transfer force to a disc and a confronting member for clamping a disc between said transfer roller and it;
   at least one of said transfer roller and said confronting member is supported by arms disposed so as to rotate with respect to said cabinet; and
   when said transfer mechanism is located at a position where it is overlapped with said disc driving unit, both of said transfer roller and said confronting member are located on one side of a disc transfer plane, whereas when a disc is to be transferred by said transfer mechanism, said arms are rotated so as to move said transfer roller and said confronting member to positions where they confront each other across the disc transfer plane.

16. A disc device according to claim 15, wherein the other of said transfer roller and said confronting member which is not supported by said arms is supported by parallel links disposed so as to rotate with respect to said cabinet and moved by the rotation of said parallel links to a position where a disc can be clamped between said transfer roller and said confronting member.

17. A disc device according to claim 15, wherein said transfer roller and said confronting member are simultaneously moved by the driving force of the same drive source from positions where they are overlapped with said disc driving unit to positions where they can transfer a disc without being overlapped with said disc driving unit.

* * * * *